(12) United States Patent  (10) Patent No.: US 9,137,148 B2
Masaki  (45) Date of Patent: Sep. 15, 2015

(54) INFORMATION PROCESSING SYSTEM AND INFORMATION PROCESSING APPARATUS

(71) Applicant: FUJITSU LIMITED, Kawasaki-shi (JP)

(72) Inventor: Atsushi Masaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 13/738,022

(22) Filed: Jan. 10, 2013

(65) Prior Publication Data

US 2013/0201992 A1  Aug. 8, 2013

(30) Foreign Application Priority Data

Feb. 2, 2012 (JP) .................................. 2012-020624

(51) Int. Cl.
 H04L 12/28 (2006.01)
 H04L 12/709 (2013.01)
(52) U.S. Cl.
 CPC ............... *H04L 45/245* (2013.01); *Y02B 60/33* (2013.01)
(58) Field of Classification Search
 CPC ..... H04L 45/245; H04L 47/20; H04L 12/433; Y02B 60/33; G06F 9/5061
 USPC .......... 370/228, 230, 252, 253, 255, 357, 386
 See application file for complete search history.

(56) References Cited

U.S. PATENT DOCUMENTS

| 6,286,104 | B1 * | 9/2001 | Buhle et al. ....................... 726/4 |
| 7,076,537 | B2 * | 7/2006 | Ward et al. .................... 709/220 |
| 7,660,316 | B2 * | 2/2010 | Warren et al. ................. 370/401 |
| 8,381,264 | B1 * | 2/2013 | Corddry et al. ................... 726/3 |
| 8,392,575 | B1 * | 3/2013 | Marr ............................. 709/226 |
| 2007/0115846 | A1 * | 5/2007 | Kooyers et al. ............... 370/252 |
| 2009/0292932 | A1 | 11/2009 | Oyama et al. |

FOREIGN PATENT DOCUMENTS

| JP | 2006-174157 | 6/2006 |
| JP | 2010-187166 | 8/2010 |

OTHER PUBLICATIONS

Japanese Office Action mailed Jul. 14, 2015 for corresponding Japanese Patent Application No. 2012-020624, with Partial English Translation, 3 pages.

* cited by examiner

*Primary Examiner* — Brian O'Connor
(74) *Attorney, Agent, or Firm* — Fujitsu Patent Center

(57) ABSTRACT

A control unit included in an information processing system determines, on the basis of information indicative of interface units and path information indicative of communication paths through a plurality of relay apparatus, whether or not the number of communication paths for access from the interface units to a node is greater than the number of the interface units. When the number of the communication paths is greater than the number of the interface units, the control unit controls the plurality of relay apparatus so as to block a part of the communication paths.

7 Claims, 23 Drawing Sheets

FIG. 9

| SWITCH MANAGEMENT TABLE ||||| 111 |
|---|---|---|---|---|
| SWITCH IP ADDRESS | FABRIC ID | DOMAIN ID | POWER STATE | DESIGNATION FLAG |
| 192.168.0.1 | 1 | 1 | ON | 0 |
| 192.168.0.2 | 1 | 2 | ON | 0 |
| 192.168.0.3 | 1 | 3 | ON | 0 |
| 192.168.0.4 | 1 | 4 | ON | 0 |
| 192.168.0.5 | 2 | 1 | ON | 0 |
| 192.168.0.6 | 3 | 1 | ON | 0 |
| 192.168.0.7 | NONE | NONE | OFF | 0 |

FIG. 10

| LUN MANAGEMENT TABLE | | | | |
|---|---|---|---|---|
| SERVER IP ADDRESS | ACCESS PATH NUMBER | LUN | SERVER WWN | STORAGE WWN |
| 192.168.0.101 | 1 | LUN2 | WWN1 | WWN13 |
| | 2 | | WWN2 | WWN14 |
| | 3 | LUN3 | WWN1 | WWN13 |
| | 4 | | WWN2 | WWN14 |
| 192.168.0.102 | 5 | LUN1 | WWN3 | WWN11 |
| | 6 | | WWN4 | WWN12 |
| | 7 | LUN2 | WWN3 | WWN13 |
| | 8 | | WWN4 | WWN14 |

| CONNECTION MANAGEMENT TABLE | | | 113 |
|---|---|---|---|
| WWN | FABRIC ID | DOMAIN ID | |
| WWN1 | 1 | 1 | |
| WWN2 | 2 | 1 | |
| WWN3 | 1 | 1 | |
| WWN4 | 2 | 1 | |
| WWN11 | 1 | 2 | |
| WWN12 | 2 | 1 | |
| WWN13 | 1 | 4 | |
| WWN14 | 2 | 1 | |

FIG. 12

| PATH TABLE | | | | | 114 |
|---|---|---|---|---|---|
| FABRIC ID | DOMAIN IDS OF SWITCHES ON PATH | | | | |
| 1 | 1 | 2 | — | — | |
|  | 1 | 3 | — | — | |
|  | 1 | 2 | 4 | — | |
|  | 1 | 3 | 4 | — | |
|  | 1 | 2 | 4 | 3 | |
|  | 1 | 3 | 4 | 2 | |
|  | 2 | 1 | 3 | — | |
|  | ... | ... | ... | ... | |
| 2 | 1 | — | — | — | |

FIG. 13

PATH MANAGEMENT TABLE 115

| SERVER IP ADDRESS | ACCESS PATH NUMBER | LUN | SERVER WWN | STORAGE WWN | NETWORK PATH ||||
|---|---|---|---|---|---|---|---|---|
| | | | | | FABRIC ID | DOMAIN IDS OF SWITCHES ON PATH ||| NUMBER OF PATHS |
| 192.168.0.101 | 1 | LUN2 | WWN1 | WWN13 | 1 | 1 | 2 | 4 | — | 2 |
| | 2 | | WWN2 | WWN14 | 2 | 1 | 3 | 4 | — | 1 |
| | 3 | LUN3 | WWN1 | WWN13 | 1 | 1 | — | — | — | 2 |
| | 4 | | WWN2 | WWN14 | 2 | 1 | 2 | 4 | — | 1 |
| 192.168.0.102 | 5 | LUN1 | WWN3 | WWN11 | 1 | 1 | 3 | 4 | — | 2 |
| | 6 | | WWN4 | WWN12 | 2 | 1 | 2 | — | 2 | 1 |
| | 7 | LUN2 | WWN3 | WWN13 | 1 | 1 | 2 | 4 | — | 2 |
| | 8 | | WWN4 | WWN14 | 2 | 1 | 3 | 4 | — | 1 |

FIG. 16A

PATH MANAGEMENT TABLE (115)

| ACCESS PATH NUMBER | NETWORK PATH | | | | | NUMBER OF PATHS |
|---|---|---|---|---|---|---|
| | FABRIC ID | DOMAIN IDS OF SWITCHES ON PATH | | | | |
| 1 | 1 | 1 | 2 | 4 | — | 2 |
| | | 1 | 3 | 4 | — | |
| 2 | 2 | 1 | — | — | — | 1 |
| 3 | 1 | 1 | 2 | 4 | — | 2 |
| | | 1 | 3 | 4 | — | |
| 4 | 2 | 1 | — | — | — | 1 |
| 5 | 1 | 1 | 2 | — | — | 2 |
| | | 1 | 3 | 4 | 2 | |
| 6 | 2 | 1 | — | — | — | 1 |
| 7 | 1 | 1 | 2 | 4 | — | 2 |
| | | 1 | 3 | 4 | — | |
| 8 | 2 | 1 | — | — | — | 1 |

FIG. 16B

SWITCH MANAGEMENT TABLE (111)

| FABRIC ID | DOMAIN ID | POWER STATE | DESIGNATION FLAG |
|---|---|---|---|
| 1 | 1 | ON | 0 |
| 1 | 2 | ON | 0 |
| 1 | 3 | ON | 0 |
| 1 | 4 | ON | 0 |
| 2 | 1 | ON | 1 |
| 3 | 1 | ON | 0 |
| NONE | NONE | OFF | 0 |

FIG. 17A

PATH MANAGEMENT TABLE (115)

| ACCESS PATH NUMBER | NETWORK PATH | | | | | NUMBER OF PATHS |
|---|---|---|---|---|---|---|
| | FABRIC ID | DOMAIN IDS OF SWITCHES ON PATH | | | | |
| 1 | 1 | 1 | 2 | 4 | — | 2 |
| | | 1 | 3 | 4 | — | |
| 2 | 2 | 1 | — | — | — | 1 |
| 3 | 1 | 1 | 2 | 4 | — | 2 |
| | | 1 | 3 | 4 | — | |
| 4 | 2 | 1 | — | — | — | 1 |
| 5 | 1 | 1 | 2 | — | — | 2 |
| | | 1 | 3 | 4 | 2 | |
| 6 | 2 | 1 | — | — | — | 1 |
| 7 | 1 | 1 | 2 | 4 | — | 2 |
| | | 1 | 3 | 4 | — | |
| 8 | 2 | 1 | — | — | — | 1 |

FIG. 17B

SWITCH MANAGEMENT TABLE (111)

| FABRIC ID | DOMAIN ID | POWER STATE | DESIGNATION FLAG |
|---|---|---|---|
| 1 | 1 | ON | 1 |
| 1 | 2 | ON | 1 |
| 1 | 3 | ON | 0 |
| 1 | 4 | ON | 1 |
| 2 | 1 | ON | 1 |
| 3 | 1 | ON | 0 |
| NONE | NONE | OFF | 0 |

FIG. 18A

SWITCH MANAGEMENT TABLE

| FABRIC ID | DOMAIN ID | POWER STATE | DESIGNATION FLAG |
|---|---|---|---|
| 1 | 1 | ON | 1 |
| 1 | 2 | ON | 1 |
| 1 | 3 | ON | 2 |
| 1 | 4 | ON | 1 |
| 2 | 1 | ON | 1 |
| 3 | 1 | ON | 2 |
| NONE | NONE | OFF | 2 |

FIG. 18B

SWITCH MANAGEMENT TABLE

| FABRIC ID | DOMAIN ID | POWER STATE | DESIGNATION FLAG |
|---|---|---|---|
| 1 | 1 | ON | 1 |
| 1 | 2 | ON | 1 |
| 1 | 3 | OFF | 2 |
| 1 | 4 | ON | 1 |
| 2 | 1 | ON | 1 |
| 3 | 1 | OFF | 2 |
| NONE | NONE | OFF | 2 | ized on one link by making the cost of a high usage link
INFORMATION PROCESSING SYSTEM AND INFORMATION PROCESSING APPARATUS

CROSS-REFERENCE TO RELATED APPLICATION

This application is based upon and claims the benefit of priority of the prior Japanese Patent Application No. 2012-020624, filed on Feb. 2, 2012, the entire contents of which are incorporated herein by reference.

FIELD

The embodiments discussed herein are related to an information processing system and an information processing apparatus.

BACKGROUND

Information processing systems in which a plurality of nodes (information processing apparatus, such as computers, or storage apparatus, for example) are connected via a plurality of relay apparatus are used. These relay apparatus relay communication between nodes and form a network.

Redundant communication paths may be set in networks. Even if one of a plurality of communication paths set cannot be used, communication can be continued by the use of another communication path. As a result, the reliability of a network can be improved. For example, verifying the reliability of a network by tracing a connection relationship in the network from an access source apparatus to an access destination apparatus and determining whether or not there is a redundant route between them is proposed.

Furthermore, if communication is performed by selecting one of a plurality of links the cost of which is low, the following method for saving power is proposed. Communication is centralized on one link by making the cost of a high usage link low. When the usage of the other links becomes zero, power is disconnected from the other links. After that, when the usage of the link on which communication is centralized rises further to a determined value, power is applied to the other links, which are in a power off state, to restore redundancy.
Japanese Laid-open Patent Publication No. 2006-174157
Japanese Laid-open Patent Publication No. 2010-187166

By the way, there are cases where the level of the redundancy of communication paths between relay apparatus is higher than that of the redundancy of communication paths (number of communication paths) ensured on a node side.

For example, interface units for making a connection to a network the number of which corresponds to the level of redundancy ensured are included on the node side. On the other hand, a new node may be connected to a relay apparatus after its installation in order to enhance throughput or add a function. Accordingly, in order to avoid a subsequent change in connection between the relay apparatus, a connection structure which can accommodate a future increase in traffic or the like may be prepared in advance. However, the level of redundancy ensured on the node side may not match the level of the redundancy of communication paths between the relay apparatus and the latter may be higher than the former.

In this case, how to efficiently reduce the number of excess communication paths between the relay apparatus matters. For example, it takes many man-hours for a system administrator to perform the work of checking whether or not there are excess communication paths for each node. This method is inefficient. In particular, as the scale of a network grows, this work becomes more difficult.

SUMMARY

According to an aspect, there is provided an information processing system including a plurality of relay apparatus which relay communication between a first node and a second node and an information processing apparatus which determines on the basis of information indicative of a plurality of interface units included in the first node and used for access from the first node to the second node and path information indicative of communication paths through the plurality of relay apparatus whether or not a number of a plurality of communication paths through the plurality of relay apparatus for access from the plurality of interface units to the second node is greater than a number of the plurality of interface units and which controls, at the time of the number of the plurality of communication paths being greater than the number of the plurality of interface units, the plurality of relay apparatus so as to block a part of the plurality of communication paths.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is an example of a switch management table in the second embodiment;

FIG. 10 is an example of a LUN management table in the second embodiment;

FIG. 11 is an example of a connection management table in the second embodiment;

FIG. 12 is an example of a path table in the second embodiment;

FIG. 13 is an example of a path management table in the second embodiment;

FIGS. 16A and 16B are an example in the second embodiment of determining an FC switch apparatus from which power is to be disconnected (part 1);

FIGS. 17A and 17B are an example in the second embodiment of determining an FC switch apparatus from which power is to be disconnected (part 2);

FIGS. 18A and 18B are an example in the second embodiment of determining an FC switch apparatus from which power is to be disconnected (part 3);

DESCRIPTION OF EMBODIMENTS

Figure 1:
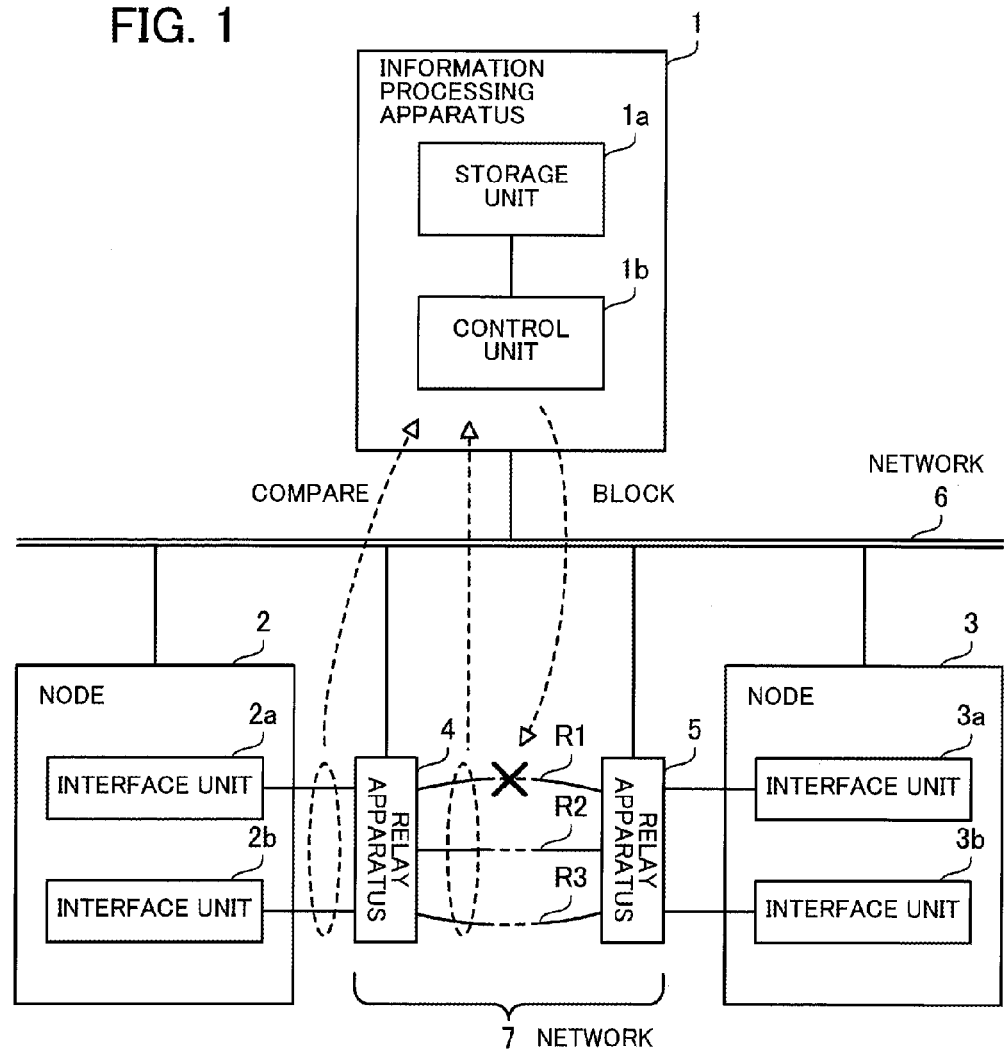
FIG. 1 illustrates an information processing system according to a first embodiment.

Embodiments will now be described with reference to the accompanying drawings, wherein like reference numerals refer to like elements throughout.

First Embodiment

FIG. 1 illustrates an information processing system according to a first embodiment. An information processing system according to a first embodiment includes an information processing apparatus 1, nodes 2 and 3, and a plurality of relay apparatus including relay apparatus 4 and 5. The information processing apparatus 1 is connected to the nodes 2 and 3 and the relay apparatus 4 and 5 via a network 6. For example, the network 6 is a network for management. For example, the network 6 may be a network using Ethernet (registered trademark).

The node 2 is connected to the relay apparatus 4. The node 3 is connected to the relay apparatus 5. The relay apparatus 4 and 5 belong to a network 7. The relay apparatus 4 and 5 relay communication in the network 7. A relay apparatus other than the relay apparatus 4 and 5 may belong to the network 7. For example, another relay apparatus may be located between the relay apparatus 4 and 5. That is to say, the nodes 2 and 3 are connected via a plurality of relay apparatus. It may safely be said that the nodes 2 and 3 are connected via the network 7.

For example, the network 7 may be a network using Fibre Channel (FC). The nodes 2 and 3 can be considered as an information processing apparatus and a storage apparatus respectively. In that case, the network 7 can be considered as a SAN (Storage Area Network) which the node 2 uses for accessing the node 3.

The node 2 includes interface units 2a and 2b. The interface units 2a and 2b are connected to the relay apparatus 4 by determined cables. The interface units 2a and 2b are interfaces which the node 2 uses for accessing the node 3 via the network 7.

The node 3 includes interface units 3a and 3b. The interface units 3a and 3b are connected to the relay apparatus 5 by determined cables. The interface units 3a and 3b are interfaces which the node 3 uses for accessing the node 2 via the network 7.

However, the interface units 2b and 3b may be connected to a network other than the network 7. For example, the interface unit 2b may be connected to a relay apparatus other than the relay apparatus 4. Furthermore, the interface unit 3b may be connected to a relay apparatus other than the relay apparatus 5. In that case, the node 2, for example, can also access the node 3 via a network other than the network 7.

The information processing apparatus 1 is used for controlling the information processing system according to the first embodiment. The information processing apparatus 1 may include a processor, such as a CPU (Central Processing Unit), and a memory, such as a RAM (Random Access Memory), and be a computer in which the processor executes a program stored in the memory. The information processing apparatus 1 includes a storage unit 1a and a control unit 1b.

The storage unit 1a stores information indicative of the interface units 2a and 2b and path information indicative of communication paths (in the network 7) through a plurality of relay apparatus. For example, the information indicative of the interface units 2a and 2b can be acquired from the node 2. The control unit 1b may acquire the information indicative of the interface units 2a and 2b from the node 2 and store it in the storage unit 1a. Furthermore, the path information can be acquired from, for example, the plurality of relay apparatus. The control unit 1b may acquire the path information from the plurality of relay apparatus and store it in the storage unit 1a.

On the basis of the information stored in the storage unit 1a, the control unit 1b determines whether or not the number of a plurality of communication paths through the plurality of relay apparatus for access from the interface units 2a and 2b to the node 3 is greater than that of the interface units 2a and 2b. A communication path through the plurality of relay apparatus for access from the interface units 2a and 2b to the node 3 is a communication path which can be used in the network 7 for access from the interface units 2a and 2b to the node 3. For example, it is assumed that the interface unit 2a is connected to the relay apparatus 4 and that the node 3 is connected to the relay apparatus 5. Then there may be a plurality of communication paths between the relay apparatus 4 and 5. It is assumed that there are communication paths R1, R2, and R3 between the relay apparatus 4 and 5.

If the number of the communication paths R1, R2, and R3 is greater than that of the interface units 2a and 2b, then the control unit 1b controls the plurality of relay apparatus so as to block a part of the communication paths R1, R2, and R3.

For example, the number of the interface units 2a and 2b is "2". On the other hand, the number of the communication paths R1, R2, and R3 is "3". In this case, the number ("3") of the communication paths R1, R2, and R3 is greater than that ("2") of the interface units 2a and 2b. Accordingly, the control unit 1b controls the plurality of relay apparatus so as to block a part of the communication paths R1, R2, and R3. For example, the control unit 1b may block the communication path R1 by exercising control so as to disconnect power from other relay apparatus located between the relay apparatus 4 and 5 on the communication path R1.

With the information processing system according to the first embodiment the control unit 1b determines, on the basis of the information stored in the storage unit 1a, whether or not the number of the communication paths R1, R2, and R3 is greater than that of the interface units 2a and 2b. If the number of the communication paths R1, R2, and R3 is greater than that of the interface units 2a and 2b, then the control unit 1b controls the plurality of relay apparatus so as to block a part of the communication paths R1, R2, and R3.

For example, a change in connection among relay apparatus may require an advanced knowledge or experience. Accordingly, in order to avoid a subsequent change in connection, a connection structure which can accommodate a future increase in traffic or the like may be prepared in advance (at installation time, for example). However, the level of the redundancy of communication paths ensured on the node 2 side or the node 3 side may not match the level of the redundancy of communication paths actually set in the network 7 and the latter may be higher than the former. For example, if there are excess communication paths, then the power consumption of a relay apparatus (or a part of relay apparatus) on each of these communication paths matters. The reason for this is that the level of the redundancy of communication paths ensured on the node 2 side or the node 3 side should also be ensured in the network 7. For example, to maintain excess communication paths involves excess consumption of power. Accordingly, if there are excess communication paths, it is desirable to reduce the number of them. In this case, a system administrator may perform the work of checking whether or not there are excess communication paths for each node. However, it takes many man-hours for the system administrator to perform this work. This method is inefficient. In particular, as the scale of a network grows, this work becomes more difficult.

On the other hand, the information processing apparatus 1 acquires the number of the communication paths R1, R2, and R3 on the basis of path information and compares this number with the number of the interface units 2a and 2b included in the node 2. The interface units 2a and 2b are included according to the level of the redundancy of communication paths ensured on the node 2 side. The number of the interface units 2a and 2b reflects the level of the redundancy of communication paths ensured on the node 2 side. If the number of the communication paths R1, R2, and R3 is greater than that of the interface units 2a and 2b, then the information processing apparatus 1 controls the plurality of relay apparatus so as to block a part of the communication paths R1, R2, and R3. As a result, there is no need for the system administrator to perform the work of checking whether or not there are excess communication paths, and the number of excess communication paths can be reduced efficiently.

The control unit 1b may determine the number of communication paths to be blocked so that the number of communication paths after the blocking will not be smaller than the number of the interface units 2a and 2b included in the node 2. In the above example, the number of the communication paths is "3" and the number of the interface units 2a and 2b included in the node 2 is "2". Accordingly, the control unit 1b blocks one (communication path R1, for example) of the communication paths R1, R2, and R3. This makes it possible to reduce the number of excess communication paths while ensuring in the network 7 the level of the redundancy of communication paths ensured on the node 2 side.

In addition, the control unit 1b may block the communication path R1 by exercising control so as to disconnect power from another relay apparatus located between the relay apparatus 4 and 5 on the communication path R1. Alternatively, the control unit 1b may block the communication path R1 by exercising control so as to partially disconnect power from a communication port which belongs to the communication path R1 and which is included in one of the relay apparatus 4 and 5 and other relay apparatus. By disconnect power from a relay apparatus (or a part of ports included in the relay apparatus), the number of excess communication paths can be reduced and the saving of power can be realized.

Second Embodiment

Figure 2:
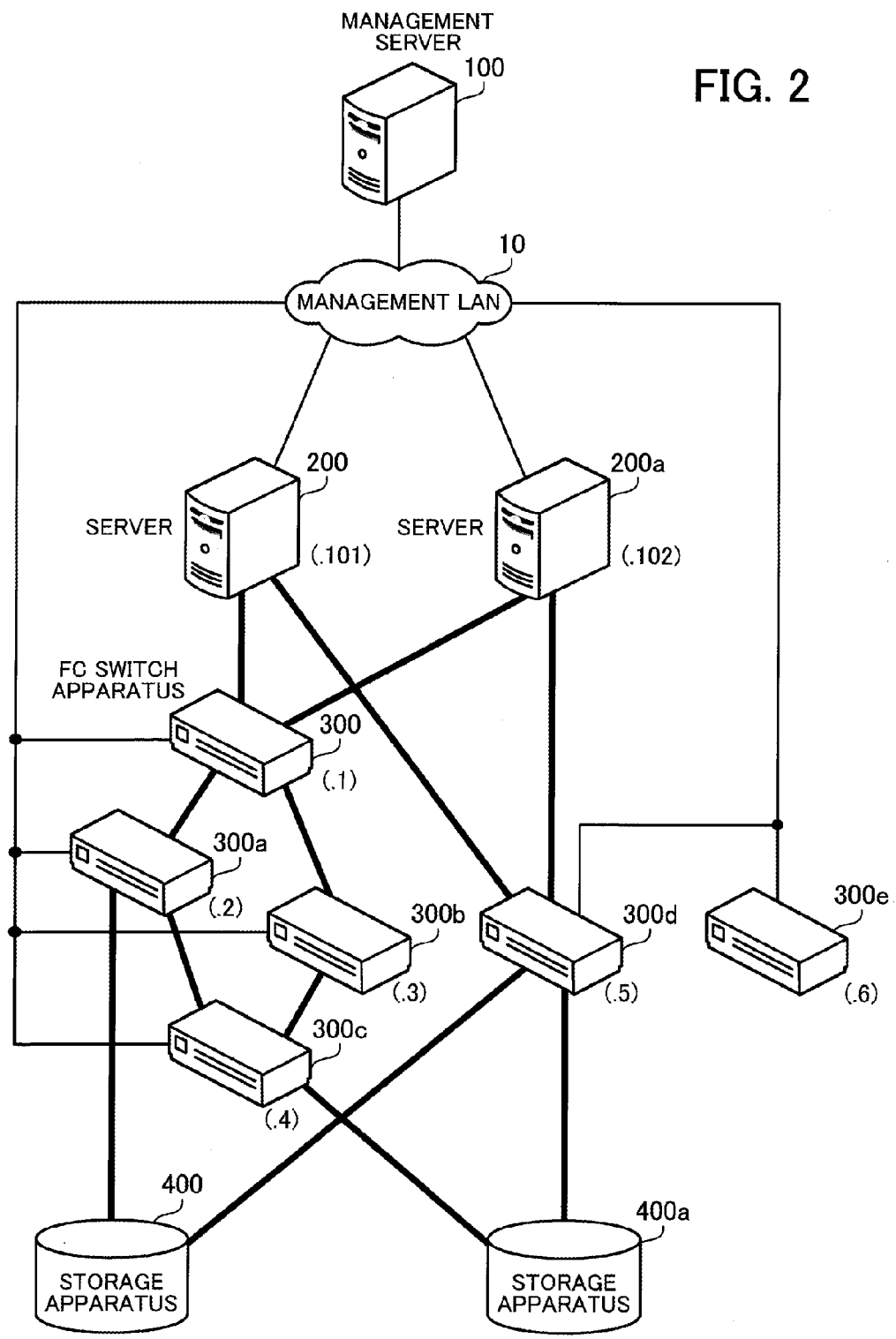
FIG. 2 illustrates a storage system according to a second embodiment.

FIG. 2 illustrates a storage system according to a second embodiment. A storage system according to a second embodiment includes a management server 100, servers 200 and 200a, FC switch apparatus 300, 300a, 300b, 300c, 300d, and 300e, and storage apparatus 400 and 400a. The storage system according to the second embodiment is a system in which the servers 200 and 200a access the storage apparatus 400 and 400a via an FC network.

The management server 100 is connected to the servers 200 and 200a and the FC switch apparatus 300, 300a, 300b, 300c, 300d, and 300e via a management LAN (Local Area Network) 10. The management LAN 10 is an Ethernet network. The servers 200 and 200a and the storage apparatus 400 and 400a are connected to one another via the FC switch apparatus 300, 300a, 300b, 300c, and 300d.

The management server 100 is a server computer for controlling the servers 200 and 200a and the FC switch apparatus 300, 300a, 300b, 300c, 300d, and 300e.

Each of the servers 200 and 200a is a server computer for performing a process by the use of data stored in the storage apparatus 400 and 400a. For example, each of the servers 200 and 200a may be connected to a second network (not illustrated in FIG. 2) and provide determined services for a client computer (not illustrated in FIG. 2) or another server computer (not illustrated in FIG. 2) via the second network. For example, each of the servers 200 and 200a may function as a file server for storing data in the storage apparatus 400 and 400a. Each of the servers 200 and 200a may function as a Web server for providing Web services based on data stored in the storage apparatus 400 and 400a. Each of the servers 200 and 200a may function as an AP (APplication) server for performing a process based on data stored in the storage apparatus 400 and 400a and providing a result. Each of the servers 200 and 200a may function as a DB (DataBase) server for manipulating a DB file stored in the storage apparatus 400 and 400a.

The IP (Internet Protocol) address of the server 200 in the management LAN 10 is "192.168.0.101". The IP address of the server 200a in the management LAN 10 is "192.168.0.102". A number in parentheses next to each of the servers 200 and 200a in FIG. 2 represents only a host address portion of its IP address and a network address portion is omitted. (The same applies to each FC switch apparatus.)

The FC switch apparatus 300, 300a, 300b, 300c, and 300d are relay apparatus which form an FC network between the servers 200 and 200a and the storage apparatus 400 and 400a. This network may also be referred to as a SAN. The FC switch apparatus 300e is not connected to the FC network. The FC switch apparatus 300e is a spare apparatus. For example, when a failure occurs in the FC switch apparatus 300, 300a, 300b, 300c, or 300d, the FC switch apparatus 300e is used in place of it.

The IP address of the FC switch apparatus 300 in the management LAN 10 is "192.168.0.1". The IP address of the FC switch apparatus 300a in the management LAN 10 is "192.168.0.2". The IP address of the FC switch apparatus 300b in the management LAN 10 is "192.168.0.3". The IP address of the FC switch apparatus 300c in the management LAN 10 is "192.168.0.4". The IP address of the FC switch apparatus 300d in the management LAN 10 is "192.168.0.5". The IP address of the FC switch apparatus 300e in the management LAN 10 is "192.168.0.6".

Each of the storage apparatus 400 and 400a is a storage apparatus for storing data to be handled by the servers 200 and 200a. Each of the storage apparatus 400 and 400a includes a plurality of storage units such as HDDs (Hard Disk Drives) or SSDs (Solid State Drives). Each of the storage apparatus 400 and 400a may have the function of RAID (Redundant Arrays of Inexpensive Disks) by which a plurality of storage units can be treated logically as one storage unit. Furthermore, each of the storage apparatus 400 and 400a includes an adapter for making a connection to the FC network.

The servers 200 and 200a, the FC switch apparatus 300, 300a, 300b, 300c, and 300d, and the storage apparatus 400 and 400a are connected in the following way. These apparatus are connected by FC cables.

The server 200 is connected to the FC switch apparatus 300 and 300d. The server 200a is connected to the FC switch apparatus 300 and 300d. The FC switch apparatus 300a is connected to the FC switch apparatus 300 and 300c. The FC switch apparatus 300b is connected to the FC switch apparatus 300 and 300c. The storage apparatus 400 is connected to the FC switch apparatus 300a and 300d. The storage apparatus 400a is connected to the FC switch apparatus 300c and 300d.

In addition, each FC switch apparatus in the second embodiment relays communication between a plurality of nodes (servers 200 and 200a and the storage apparatus 400 and 400a). In this case, each FC switch apparatus takes a connection form which is referred to as a fabric for FC communication. The term "fabric" may also be used as a term which means a network unit (in the connection form of the fabric) including a plurality of FC switch apparatus. Each of the FC switch apparatus 300, 300a, 300b, 300c, 300d, and 300e belongs to a fabric and holds a fabric ID (IDentifier) indicative of a fabric to which it belongs. To be concrete, the FC switch apparatus 300, 300a, 300b, and 300c belong to a fabric the fabric ID of which is "1". The FC switch apparatus 300d belongs to a fabric the fabric ID of which is "2". The FC switch apparatus 300e belongs to a fabric the fabric ID of which is "3".

Figure 3:
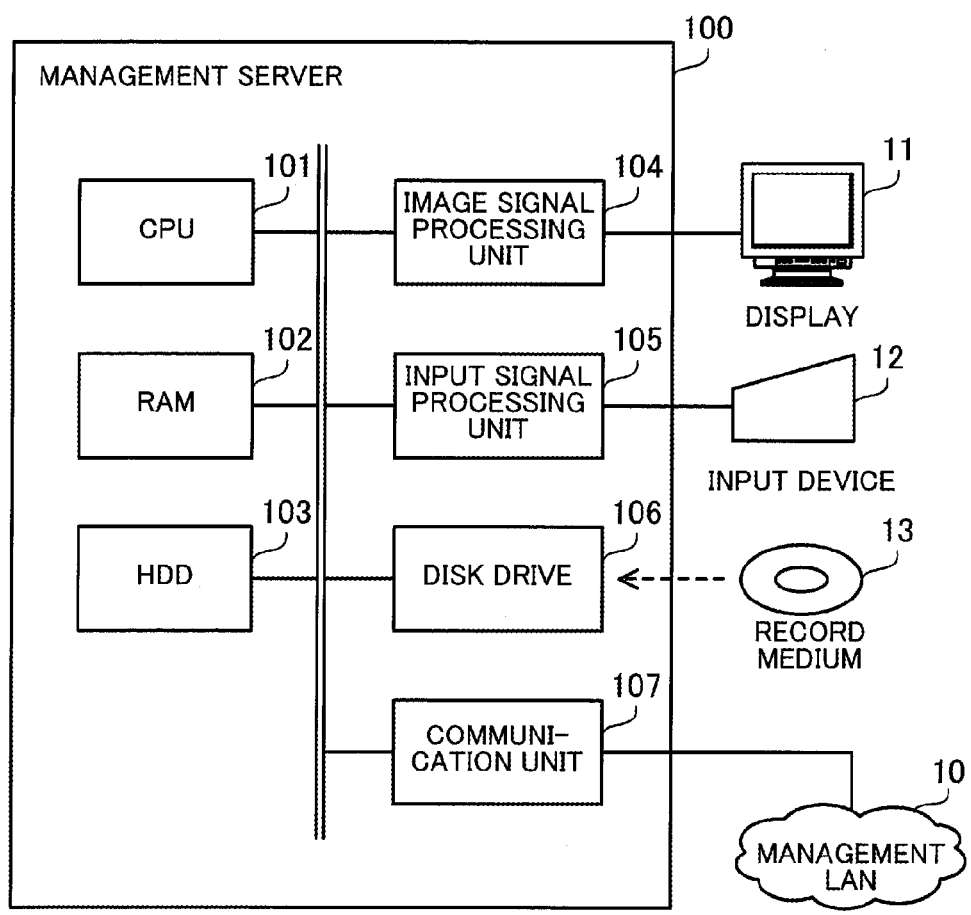
FIG. 3 is an example of hardware of a management server in the second embodiment.

FIG. 3 is an example of hardware of the management server in the second embodiment. The management server 100 includes a CPU 101, a RAM 102, an HDD 103, an image signal processing unit 104, an input signal processing unit 105, a disk drive 106, and a communication unit 107. Each unit is connected to a bus of the management server 100. The servers 200 and 200a can also be realized by the use of hardware which is the same as that of the management server 100.

The CPU 101 is a processor for controlling information processing by the management server 100. The CPU 101 reads out at least a part of a program or data stored in the HDD 103, expands it in the RAM 102, and executes the program. The management server 100 may include a plurality of processors and execute a program on a distributed basis.

The RAM 102 is a volatile memory for temporarily storing a program executed by the CPU 101 or data used by the CPU 101 for performing a process. The management server 100 may include a memory of a type different from a RAM or include a plurality of memories.

The HDD 103 is a nonvolatile storage unit for storing programs, such as an OS (Operating System) program and application programs, and data. In accordance with instructions from the CPU 101 the HDD 103 reads out data from or writes data to a built-in magnetic disk. The management server 100 may include a nonvolatile storage unit (SSD or the like) of a type different from an HDD or include a plurality of storage units.

In accordance with instructions from the CPU 101 the image signal processing unit 104 outputs an image to a display 11 connected to the management server 100. A CRT (Cathode Ray Tube) display, a liquid crystal display, or the like can be used as the display 11.

The input signal processing unit 105 acquires an input signal from an input device 12 connected to the management server 100, and outputs it to the CPU 101. A pointing device, such as a mouse or a touch panel, a keyboard, or the like can be used as the input device 12.

The disk drive 106 is a drive unit for reading a program or data recorded on a record medium 13. A magnetic disk, such as an FD (Flexible Disk) or an HDD, an optical disk, such as a CD (Compact Disc) or a DVD (Digital Versatile Disc), an MO (Magneto-Optical disk), or the like can be used as the record medium 13. In accordance with instructions from the CPU 101, for example, the disk drive 106 stores a program or data which it reads from the record medium 13 in the RAM 102 or the HDD 103.

The communication unit 107 is a communication interface for communicating with the servers 200 and 200a and the FC switch apparatus 300, 300a, 300b, 300c, 300d, and 300e via the management LAN 10. The communication unit 107 may be a wired communication interface or a radio communication interface. In addition to a communication unit for making a connection to the management LAN 10, each of the servers 200 and 200a includes a communication unit for making a connection to the FC switch apparatus 300 and 300d. This communication unit included in each of the servers 200 and 200a may be referred to as an HBA (Host Bus Adapter). Each of the servers 200 and 200a accesses the storage apparatus 400 and 400a via this communication unit.

Figure 4:
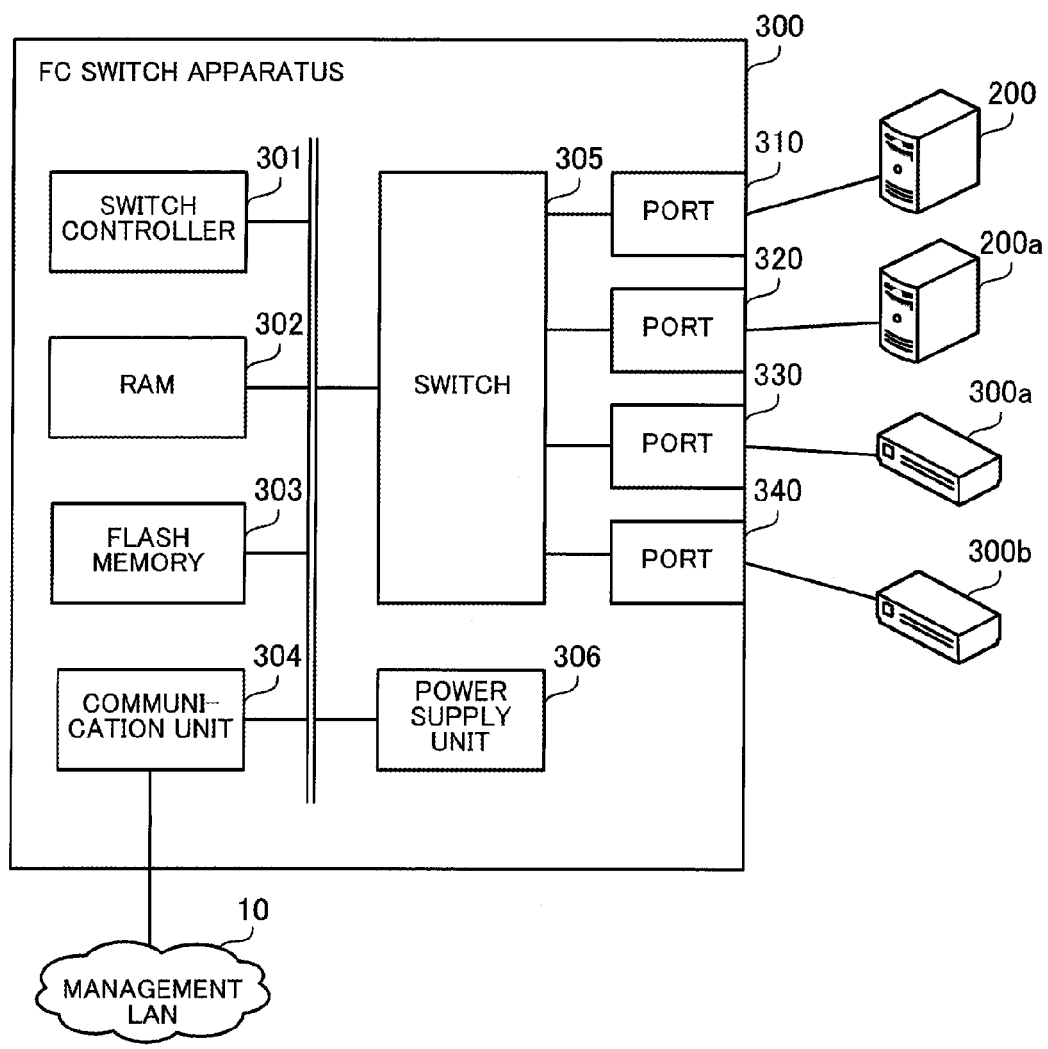
FIG. 4 is an example of hardware of an FC switch apparatus in the second embodiment.

FIG. 4 is an example of hardware of the FC switch apparatus in the second embodiment. The FC switch apparatus 300 includes a switch controller 301, a RAM 302, a flash memory 303, a communication unit 304, a switch 305, a power supply unit 306, and ports 310, 320, 330, and 340. Each unit other than the ports 310, 320, 330, and 340 is connected to a bus of the FC switch apparatus 300. The FC switch apparatus 300a, 300b, 300c, 300d, and 300e can also be realized by the use of hardware which is the same as that of the FC switch apparatus 300.

The switch controller 301 is a control circuit for controlling information processing, such as routing, by the FC switch apparatus 300.

The RAM 302 is a volatile memory for temporarily storing a program executed by the switch controller 301 or data used by the switch controller 301 for performing a process.

The flash memory 303 is a nonvolatile memory for storing a program executed by the switch controller 301 or data used by the switch controller 301 for executing a program.

The communication unit 304 is a communication interface for communicating with the management server 100 via the management LAN 10. The communication unit 304 may be a wired communication interface or a radio communication interface.

The switch 305 is connected to the ports 310, 320, 330, and 340. The switch 305 is an internal switch for allocating FC frames, each of which is a unit of data communication in FC, to the ports 310, 320, 330, and 340 in accordance with instructions from the switch controller 301.

The power supply unit 306 is a power source for supplying power to each unit of the FC switch apparatus 300. In accordance with instructions from the switch controller 301 the power supply unit 306 turns on or off power to the FC switch apparatus 300. Even when the FC switch apparatus 300 is in a power off state, the power supply unit 306 may continue to supply a small amount of power to the communication unit 304 so that the communication unit 304 can receive instructions from the management server 100 to turn on power to the FC switch apparatus 300. In accordance with instructions from the management server 100 via the communication unit 304 and the management LAN 10, the power supply unit 306 turns on or off power to the FC switch apparatus 300.

An example of connections made in accordance with FC in the storage system according to the second embodiment will now be described. First the servers 200 and 200a and the FC switch apparatus 300, 300a, 300b, 300c, 300d, and 300e will be described.

Figure 5:
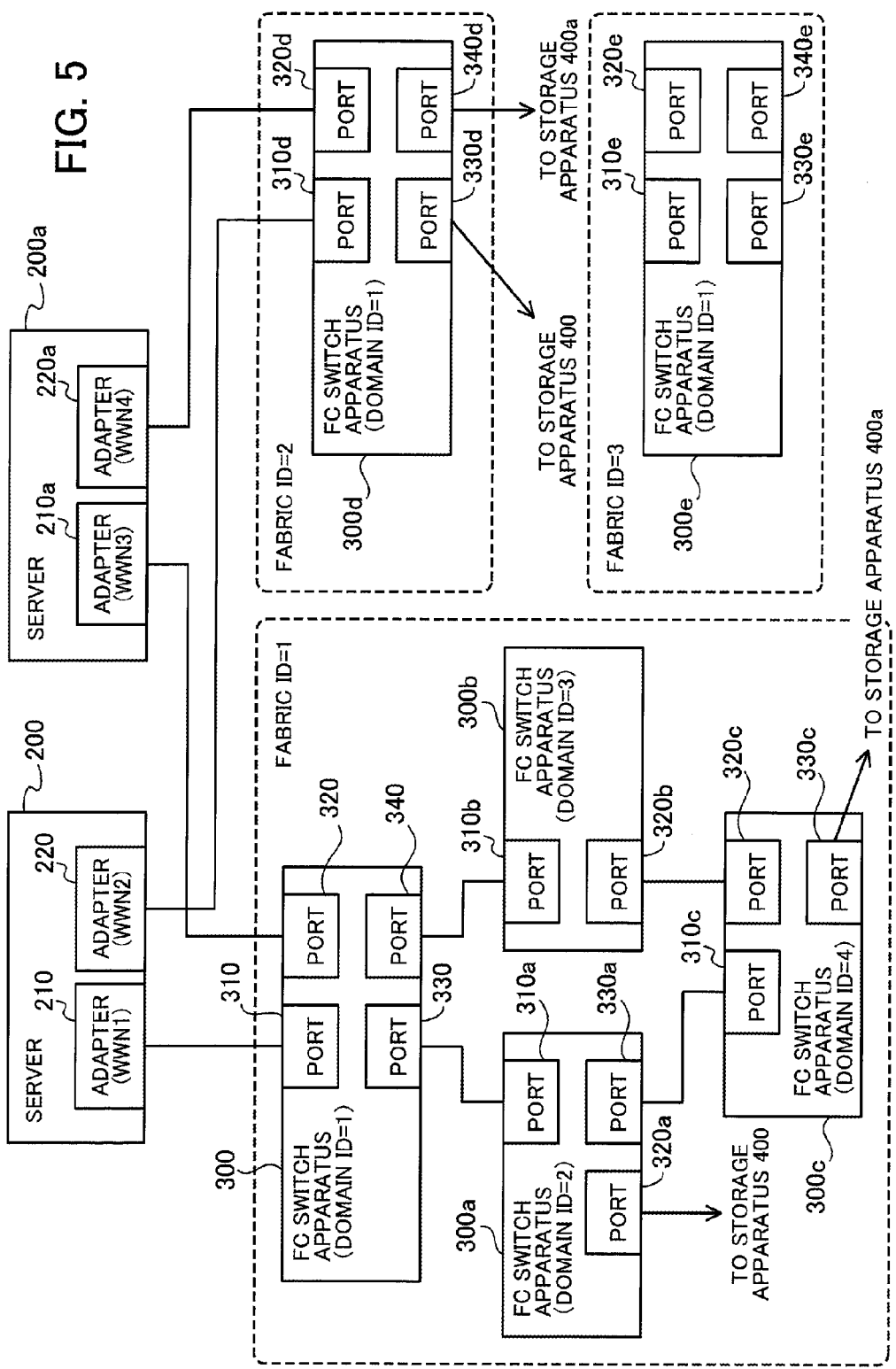
FIG. 5 is an example of connections made in accordance with FC in the second embodiment (part 1)

FIG. 5 is an example of connections made in accordance with FC in the second embodiment (part 1). The server 200 includes adapters 210 and 220. The server 200a includes adapters 210a and 220a. The adapters 210, 220, 210a, and 220a are FC adapters. The adapters 210, 220, 210a, and 220a may be referred to as HBAs. The adapters 210, 220, 210a, and 220a are examples of the interface units 2a and 2b in the first embodiment.

Identification information referred to as WWNs (World Wide Names) are given to the adapters 210, 220, 210a, and 220a. The WWN of the adapter 210 is "WWN1". The WWN of the adapter 220 is "WWN2". The WWN of the adapter 210a is "WWN3". The WWN of the adapter 220a is "WWN4". Each of the adapters 210, 220, 210a, and 220a includes at least one FC port.

In addition, the FC switch apparatus 300 includes the ports 310, 320, 330, and 340. The FC switch apparatus 300a includes ports 310a, 320a, and 330a. The FC switch apparatus 300b includes ports 310b and 320b. The FC switch apparatus 300c includes ports 310c, 320c, and 330c. The FC switch apparatus 300d includes ports 310d, 320d, 330d, and 340d. The FC switch apparatus 300e includes ports 310e, 320e, 330e, and 340e. Each port included in each FC switch apparatus is an FC port.

Identification information which is referred to as a domain ID and which is unique in a fabric is given to each FC switch apparatus. A domain ID of each FC switch apparatus in the fabric the fabric ID of which is "1" is as follows. The domain ID of the FC switch apparatus 300 is "1". The domain ID of the FC switch apparatus 300a is "2". The domain ID of the FC switch apparatus 300b is "3". The domain ID of the FC switch apparatus 300c is "4".

The domain ID of the FC switch apparatus 300d which belongs to the fabric the fabric ID of which is "2" is "1". The domain ID of the FC switch apparatus 300e which belongs to the fabric the fabric ID of which is "3" is "1".

Each FC switch apparatus can be identified by a combination of a fabric ID and a domain ID.

In the storage system according to the second embodiment the adapters 210, 220, 210a, and 220a (ports included in these adapters) and the ports included in the FC switch apparatus 300, 300a, 300b, 300c, 300d, and 300e are connected in the following way. A connection is made by fitting a connector at the end of an FC cable into a port.

The servers 200 and 200a and the FC switch apparatus 300 and 300d are connected in the following way. The adapter 210 is connected to the port 310. The adapter 220 is connected to the port 310d. The adapter 210a is connected to the port 320. The adapter 220a is connected to the port 320d.

In the fabric the fabric ID of which is "1", connections are made in the following way. The port 330 is connected to the port 310a. The port 340 is connected to the port 310b. The port 330a is connected to the port 310c. The port 320b is connected to the port 320c.

Only the FC switch apparatus 300d belongs to the fabric the fabric ID of which is "2", and the FC switch apparatus 300d is not connected to another FC switch apparatus.

Only the FC switch apparatus 300e belongs to the fabric the fabric ID of which is "3", and the FC switch apparatus 300e is not connected to another FC switch apparatus.

The storage apparatus 400 and 400a will now be described.

Figure 6:
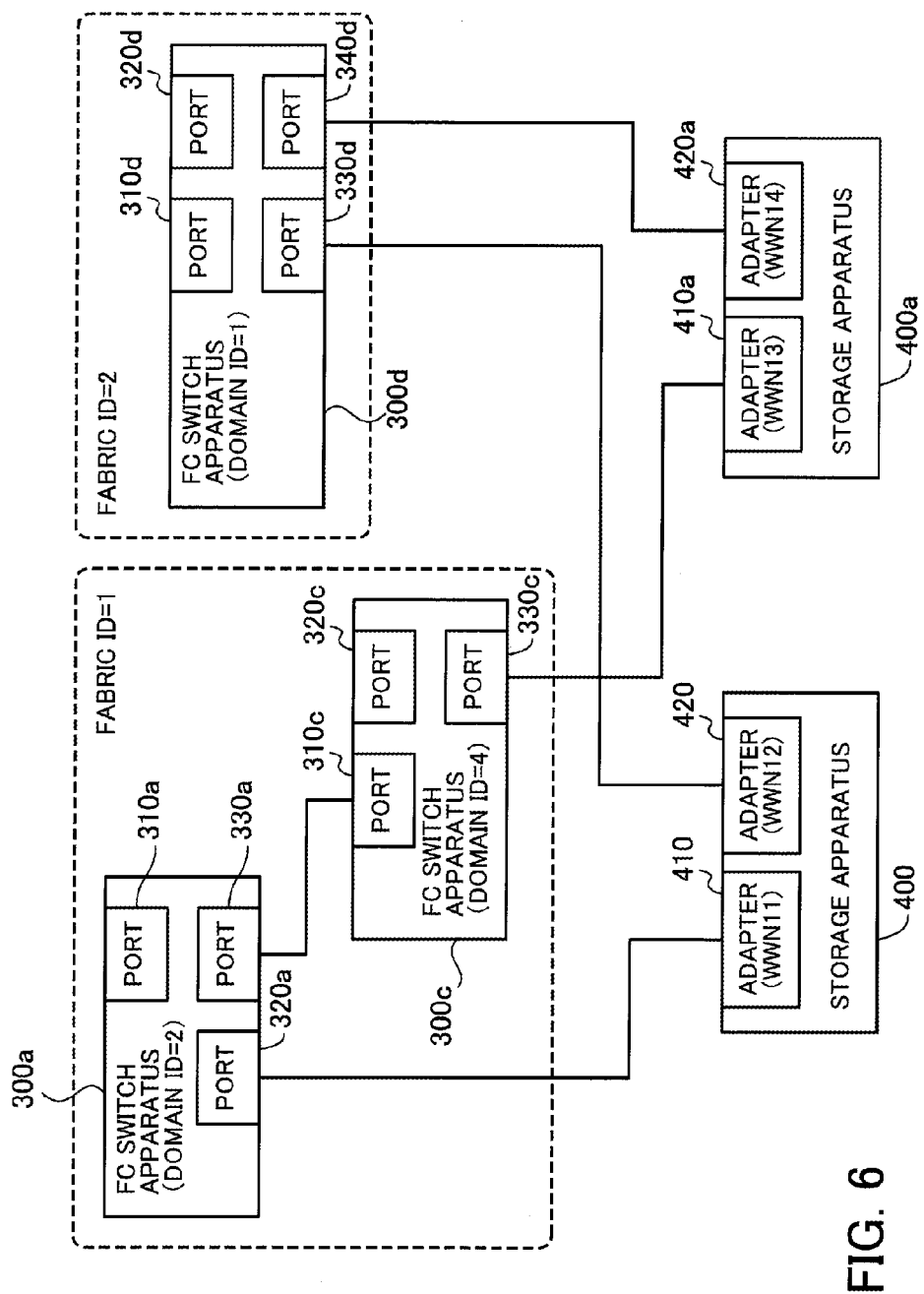
FIG. 6 is an example of connections made in accordance with FC in the second embodiment (part 2)

FIG. 6 is an example of connections made in accordance with FC in the second embodiment (part 2). The storage apparatus 400 includes adapters 410 and 420. The storage apparatus 400a includes adapters 410a and 420a. The adapters 410, 420, 410a, and 420a are FC adapters. The adapters 410, 420, 410a, and 420a may be referred to as HBAs. The adapters 410, 420, 410a, and 420a are examples of the interface units 3a and 3b in the first embodiment.

WWNs are given to the adapters 410, 420, 410a, and 420a. The WWN of the adapter 410 is "WWN11". The WWN of the adapter 420 is "WWN12". The WWN of the adapter 410a is "WWN13". The WWN of the adapter 420a is "WWN14". Each of the adapters 410, 420, 410a, and 420a includes at least one FC port.

In the storage system according to the second embodiment the adapters 410, 420, 410a, and 420a (ports included in these adapters) and the ports included in the FC switch apparatus 300, 300a, 300b, 300c, 300d, and 300e are connected in the following way. A connection is made by fitting a connector at the end of an FC cable into a port.

The adapter 410 is connected to the port 320a. The adapter 420 is connected to the port 330d. The adapter 410a is connected to the port 330c. The adapter 420a is connected to the port 340d. The FC network illustrated in FIG. 2 is formed by making the connections illustrated in FIGS. 5 and 6.

Figure 7:
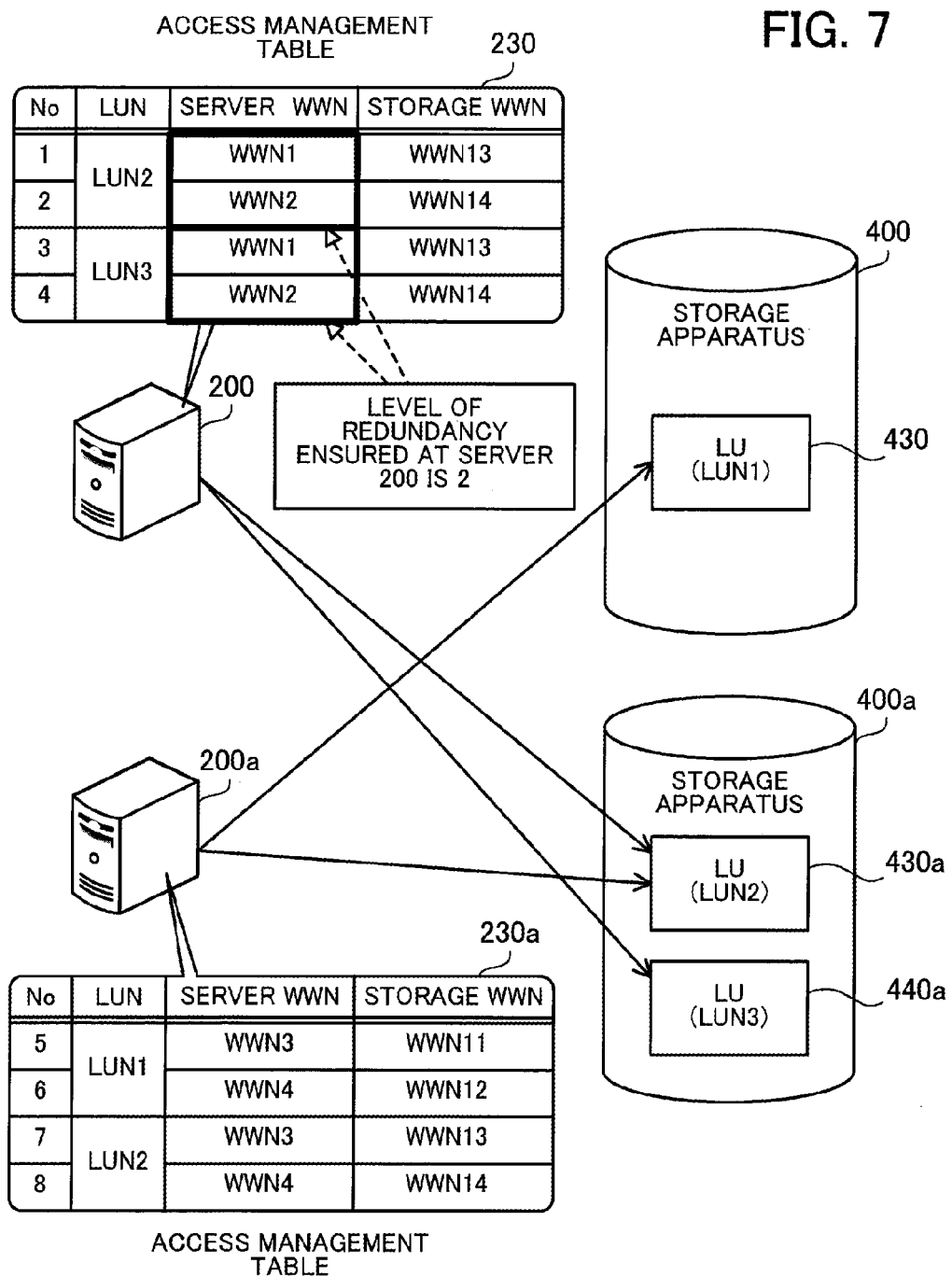
FIG. 7 is an example of access to a storage apparatus in the second embodiment.

FIG. 7 is an example of access to the storage apparatus in the second embodiment. The servers 200 and 200a access the storage apparatus 400 and 400a via the FC switch apparatus 300, 300a, 300b, 300c, and 300d. The servers 200 and 200a recognizes a storage area in the storage apparatus 400 or 400a by the logical unit (LU). Identification information which is referred to as a logical unit number (LUN) for identifying an LU in the storage apparatus 400 or 400a is given to it. An LU 430 is set in the storage apparatus 400. The LUN of the LU 430 is "LUN1". LUs 430a and 440a are set in the storage apparatus 400a. The LUNs of the LUs 430a and 440a are "LUN2" and "LUN3" respectively.

The server 200 can access the LUs 430a and 440a. The server 200a can access the LUs 430 and 430a. Which of the LUs 430, 430a, and 440a the server 200 or 200a can access is set in advance in the server 200 or 200a. To be concrete, the WWN of an adapter used for accessing the storage apparatus 400 or 400a is stored in advance in the server 200 or 200a by a storage system administrator.

According to the connections illustrated in FIGS. 5 and 6, for example, the adapter 210 is connected to the adapter 410a via the fabric the fabric ID of which is "1". In addition, the adapter 220 is connected to the adapter 420a via the fabric the fabric ID of which is "2". Therefore, pieces of information indicative of the following correspondences for access from the server 200 to the LU 430a ("LUN2") are stored in advance in the server 200.

(1) Combination of the WWN ("WWN1") of the adapter 210 and the WWN ("WWN13") of the adapter 410a. In FIG. 7, the WWN on the server 200 side is indicated by Server WWN and the WWN on the storage apparatus 400 side is indicated by Storage WWN. (The same applies to the following items.)

(2) Combination of the WWN ("WWN2") of the adapter 220 and the WWN ("WWN14") of the adapter 420a.

Similarly, pieces of information indicative of the following correspondences for access from the server 200 to the LU 440a ("LUN3") are stored in advance in the server 200.

(3) Combination of the WWN ("WWN1") of the adapter 210 and the WWN ("WWN13") of the adapter 410a.

(4) Combination of the WWN ("WWN2") of the adapter 220 and the WWN ("WWN14") of the adapter 420a.

For example, the pieces of information (1) through (4) are registered in an access management table 230 and are stored in a determined storage unit of the server 200.

Furthermore, according to the connections illustrated in FIGS. 5 and 6, the adapter 210a is connected to the adapters 410 and 410a via the fabric the fabric ID of which is "1". In addition, the adapter 220a is connected to the adapters 420 and 420a via the fabric the fabric ID of which is "2". Therefore, pieces of information indicative of the following correspondences for access from the server 200*a* to the LU 430 ("LUN1") are stored in advance in the server 200*a*.

(5) Combination of the WWN ("WWN3") of the adapter 210*a* and the WWN ("WWN11") of the adapter 410.

(6) Combination of the WWN ("WWN4") of the adapter 220*a* and the WWN ("WWN12") of the adapter 420.

Similarly, pieces of information indicative of the following correspondences for access from the server 200*a* to the LU 430*a* ("LUN2") are stored in advance in the server 200*a*.

(7) Combination of the WWN ("WWN3") of the adapter 210*a* and the WWN ("WWN13") of the adapter 410*a*.

(8) Combination of the WWN ("WWN4") of the adapter 220*a* and the WWN ("WWN14") of the adapter 420*a*.

For example, the pieces of information (5) through (8) are registered in an access management table 230*a* and are stored in a determined storage unit of the server 200*a*.

A path which is used for access from a server to an LU and the starting point of which is an adapter will be referred to as an access path from the server to the LU. For example, it can be said that paths the starting points of which are the adapters 210 ("WWN1") and 220 ("WWN2") exist as access paths from the server 200 to the LU 430*a* ("LUN2"). In the second embodiment access paths exist according to adapters. That is to say, the number of access paths from a server to one LU is equal to that of adapters which are included in the server and which can be used for access to the LU. The number of access paths corresponds to the level of the redundancy of communication paths ensured on a server side. In the access management table 230, for example, the two access paths (adapters) the starting points of which are the adapters 210 and 220 exist for access to the LU 430*a*. Therefore, the level of redundancy is "2". The same applies to the LU 440*a*.

Figure 8:
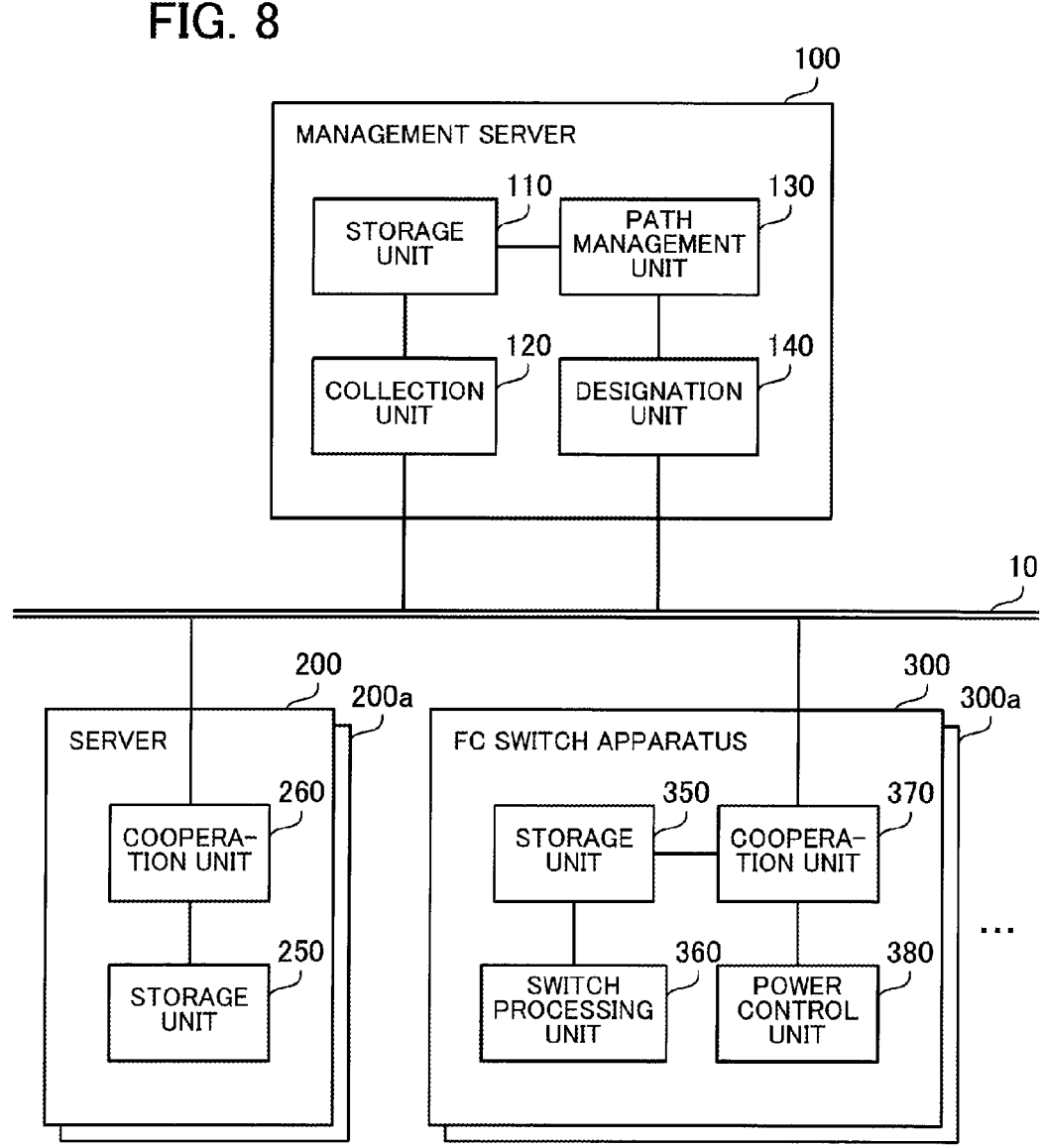
FIG. 8 is an example of software in the second embodiment.

FIG. 8 is an example of software in the second embodiment. A part or all of units illustrated in FIG. 8 may be modules of programs executed by the management server 100, the servers 200 and 200*a*, and the FC switch apparatus 300, 300*a*, 300*b*, 300*c*, 300*d*, and 300*e*. In addition, a part or all of the units illustrated in FIG. 8 may be electronic circuits such as an FPGA (Field Programmable Gate Array) and an ASIC (Application Specific Integrated Circuit). The server 200*a* can also be realized by the use of the same units that are included in the server 200. The FC switch apparatus 300*a*, 300*b*, 300*c*, 300*d*, and 300*e* can also be realized by the use of the same units that are included in the FC switch apparatus 300.

The management server 100 includes a storage unit 110, a collection unit 120, a path management unit 130, and a designation unit 140.

The storage unit 110 stores information which the collection unit 120 collects from the servers 200 and 200*a* and each FC switch apparatus. In addition, the storage unit 110 stores information which the path management unit 130 generates on the basis of the information which the collection unit 120 collects.

The collection unit 120 collects the information from the servers 200 and 200*a* and each FC switch apparatus and stores it in the storage unit 110. To be concrete, the collection unit 120 collects from the servers 200 and 200*a* information indicative of the WWNs of adapters which the servers 200 and 200*a* use for accessing the storage apparatus 400 and 400*a*. To be more concrete, the collection unit 120 collects the information registered in the access management tables 230 and 230*a* indicated in FIG. 7.

In addition, the collection unit 120 collects from each FC switch apparatus information, such as the fabric IDs of the fabrics to which the FC switch apparatus belong, their domain IDs, and their power states. Furthermore, the collection unit 120 collects from each FC switch apparatus information indicative of the connection relationship between an FC switch apparatus and a server or a storage apparatus. The collection unit 120 also collects from each FC switch apparatus path information indicative of a communication path in each fabric.

For example, when the collection unit 120 accepts instructions from the storage system administrator to start a process, the collection unit 120 collects each piece of information. The collection unit 120 may collect each piece of information regularly. The collection unit 120 may collect each piece of information by detecting a change in the connection of each FC switch apparatus.

On the basis of the information which the collection unit 120 collects and stores in the storage unit 110, the path management unit 130 determines whether or not the level of the redundancy of communication paths between FC switch apparatus (in the FC network) is higher than that of the redundancy of communication paths ensured on the server 200 side or the server 200*a* side. If the path management unit 130 determines that the level of the redundancy of communication paths between FC switch apparatus is higher than that of the redundancy of communication paths ensured on the server 200 side or the server 200*a* side, then the path management unit 130 gives the designation unit 140 instructions to block a communication path. To be concrete, the path management unit 130 gives the designation unit 140 instructions to disconnect power from an (or a plurality of) FC switch apparatus on the communication path to be blocked. After the collection unit 120 collects each piece of information, the path management unit 130 performs these processes.

The designation unit 140 transmits to the FC switch apparatus designated by the path management unit 130 instructions to turn off power.

The server 200 includes a storage unit 250 and a cooperation unit 260.

The storage unit 250 stores the access management table 230. For example, the access management table 230 is stored in advance by the storage system administrator.

When the cooperation unit 260 accepts from the collection unit 120 a request to provide information, the cooperation unit 260 provides the access management table 230 stored in the storage unit 250 to the collection unit 120.

The FC switch apparatus 300 includes a storage unit 350, a switch processing unit 360, a cooperation unit 370, and a power control unit 380.

The storage unit 350 stores the fabric ID of the fabric to which the FC switch apparatus 300 belongs and its domain ID. For example, the fabric ID and the domain ID are determined by the storage system administrator and are registered in advance in the storage unit 350. The domain ID may be determined by arbitration between FC switch apparatus in the fabric.

In addition, the storage unit 350 stores connection management information indicative of which server or storage apparatus is connected (directly by an FC cable) to which FC switch apparatus in the fabric to which the FC switch apparatus 300 belongs. Furthermore, the storage unit 350 stores path information indicative of a communication path in the fabric.

The switch processing unit 360 performs information processing (such as providing various services to nodes) in the FC switch apparatus 300. For example, the switch processing unit 360 acquires the connection relationship between a node connected to the FC switch apparatus 300 and a port, generates connection management information, and stores it in the storage unit 350. When the switch processing unit 360 receives from a node, for example, a WWN of the other end, the switch processing unit 360 returns determined address information corresponding to the WWN in the fabric (name resolution). This function may be referred to as, for example, a name server. The name server function may be realized by one FC switch apparatus in a fabric. Alternatively, each FC switch apparatus may share information and realize the name server function.

Furthermore, the switch processing unit 360 generates path information indicative of a path between all the FC switch apparatus in the fabric and stores it in the storage unit 350. This path information may be referred to as a topology database, a link state database, or the like. For example, the switch processing unit 360 uses a routing protocol referred to as FSPS (Fabric Shortest Path First) for selecting a path on the basis of the path information.

When the cooperation unit 370 accepts from the collection unit 120 a request to provide information, the cooperation unit 370 provides to the collection unit 120 the fabric ID of the fabric to which the FC switch apparatus 300 belongs, its domain ID, the connection management information, the path information, and the like stored in the storage unit 350.

In addition, when the cooperation unit 370 receives from the designation unit 140 instructions to turn off power, the cooperation unit 370 informs the power control unit 380 of the instructions.

In accordance with the instructions to turn off power of which the cooperation unit 370 informs the power control unit 380, the power control unit 380 stops the supply of power to each unit by the power supply unit 306 and puts the FC switch apparatus 300 into a power off state.

FIG. 9 is an example of a switch management table in the second embodiment. A switch management table 111 is stored in the storage unit 110. Information which the collection unit 120 collects from each FC switch apparatus is included in information registered in the switch management table 111. The switch management table 111 includes Switch IP Address, Fabric ID, Domain ID, Power State, and Designation Flag items.

The IP address of an FC switch apparatus is registered in the Switch IP Address item. For example, the IP address of each FC switch apparatus is registered in advance by the storage system administrator. The fabric ID of a fabric to which an FC switch apparatus belongs is registered in the Fabric ID item. The domain ID of an FC switch apparatus is registered in the Domain ID item. Information indicative of whether an FC switch apparatus is in a power on state or a power off state is registered in the Power State item. For example, if an FC switch apparatus is in a power on state, then the information "ON" is set. If an FC switch apparatus is in a power off state, then the information "OFF" is set. A designation flag for managing the contents of instructions to an FC switch apparatus is set in the Designation Flag item. A designation flag is updated according to a process performed by the path management unit 130. The value of a designation flag has the following meanings.

(1) The designation flag "0" indicates an initial value.
(2) The designation flag "1" indicates continuation of a power on state (that is to say, power cannot be turned off).
(3) The designation flag "2" indicates an FC switch apparatus to which instructions to turn off power are given.

For example, the switch IP address "192.168.0.1", the fabric ID "1", the domain ID "1", the power state "ON", and the designation flag "0" are registered in the switch management table 111. These pieces of information indicate that the FC switch apparatus 300 (IP address of which is "192.168.0.1") belongs to the fabric the fabric ID of which is "1", that the domain ID of the FC switch apparatus 300 is "1", and that the FC switch apparatus 300 is in a power on state. The designation flag "0" is an initial value.

For example, the switch IP address "192.168.0.7", the fabric ID "none", the domain ID "none", the power state "OFF", and the designation flag "0" are registered in the switch management table 111. This record indicates that an FC switch apparatus the IP address of which is "192.168.0.7" does not exist in the management LAN 10.

FIG. 10 is an example of a LUN management table in the second embodiment. A LUN management table 112 is stored in the storage unit 110. Information which the collection unit 120 collects from the servers 200 and 200a is registered in the LUN management table 112. The LUN management table 112 includes Server IP Address, Access Path Number, LUN, Server WWN, and Storage WWN items.

The IP address of a server is registered in the Server IP Address item. For example, the IP address of each server is registered in advance by the storage system administrator. An access path number for identifying an access path from each server to each LU is registered in the Access Path Number item. The LUN of an accessed LU is registered in the LUN item. The WWN of an adapter on the server side which can be used for accessing a corresponding LU is registered in the Server WWN item. The WWN of an adapter on the storage apparatus side which can be used for accessing a corresponding LU is registered in the Storage WWN item.

For example, the server IP address "192.168.0.101", the access path number "1", the LUN "LUN2", the server WWN "WWN1", and the storage WWN "WWN13" are registered in the LUN management table 112. These pieces of information indicate that the server 200 (IP address of which is "192.168.0.101") has an access path the access path number of which is "1" and that with the access path the access path number of which is "1", the adapter 210 the server WWN of which is "WWN1" and the adapter 410a the storage WWN of which is "WWN13" can be used for accessing an LU the LUN of which is "LUN2".

FIG. 11 is an example of a connection management table in the second embodiment. A connection management table 113 is stored in the storage unit 110. Information which the collection unit 120 collects from each FC switch apparatus is registered in the connection management table 113. The connection management table 113 includes WWN, Fabric ID, and Domain ID items.

The WWN of an adapter included in a server or a storage apparatus is registered in the WWN item. The fabric ID of a fabric to which an FC switch apparatus directly connected to a corresponding server or storage apparatus belongs is registered in the Fabric ID item. The domain ID of an FC switch apparatus is registered in the Domain ID item.

For example, the WWN "WWN1", the fabric ID "1", and the domain ID "1" are registered in the connection management table 113. These pieces of information indicate that the adapter 210 ("WWN1") is connected to the FC switch apparatus 300 (fabric ID and domain ID of which are "1"). It may safely be said that the server 200 is directly connected to the FC switch apparatus 300 (which includes the adapter 210).

FIG. 12 is an example of a path table in the second embodiment. A path table 114 is stored in the storage unit 110. Path information which the collection unit 120 collects from each FC switch apparatus is registered in the path table 114. For example, if a plurality of FC switch apparatus which belong to each fabric store the same path information, then the collection unit 120 may collect the path information from one of them. Alternatively, the collection unit 120 may merge path information which it collects from the plurality of FC switch apparatus which belong to each fabric, and register the path information after the merging in the path table 114. The path table 114 includes Fabric ID and Domain IDs of Switches on Path items.

A fabric ID is registered in the Fabric ID item. A set of the domain IDs of FC switch apparatus on a path including an FC switch apparatus at each end of the path is registered in the Domain IDs of Switches on Path item. The order of the domain IDs corresponds to the order in which data passes through the FC switch apparatus.

For example, the fabric ID "1" and the domain IDs {"1", "2"} of switches on a path are registered in the path table 114. These pieces of information indicate that the FC switch apparatus 300 and 300a (domain IDs of which are "1" and "2" respectively) are on a path the ends of which are the FC switch apparatus 300 and 300a in the fabric the fabric ID of which is "1" (in this case, there are FC switch apparatus only at both ends).

Furthermore, for example, the fabric ID "1" and the domain IDs {"1", "3", "4", "2"} of switches on a path are registered in the path table 114. These pieces of information indicate that the FC switch apparatus 300, 300b, 300c, and 300a (domain IDs of which are "1", "3", "4", and "2" respectively) are on a path the ends of which are the FC switch apparatus 300 and 300a in the fabric the fabric ID of which is "1".

FIG. 13 is an example of a path management table in the second embodiment. A path management table 115 is stored in the storage unit 110. Information which the path management unit 130 generates on the basis of information which the collection unit 120 collects and which the collection unit 120 stores in the storage unit 110 is registered in the path management table 115. The path management table 115 includes Server IP Address, Access Path Number, LUN, Server WWN, Storage WWN, and Network Path items. The Network Path item is subdivided and includes Fabric ID, Domain IDs of Switches on Path, and Number of Paths subitems.

On the basis of the LUN management table 112, the connection management table 113, and the path table 114, the path management unit 130 generates the path management table 115.

Accordingly, contents registered in the Server IP Address, Access Path Number, LUN, Server WWN, and Storage WWN items are the same as those registered in the Server IP Address, Access Path Number, LUN, Server WWN, and Storage WWN items, respectively, included in the LUN management table 112. In addition, contents registered in the Fabric ID and Domain IDs of Switches on Path subitems are the same as those registered in the Fabric ID and Domain IDs of Switches on Path items, respectively, included in the path table 114.

Furthermore, the number of paths in a fabric for one access path is registered in the Number of Paths subitem. The path management unit 130 can calculate the number of paths by counting the number of sets of the domain IDs of switches on paths corresponding to one access path.

For example, the server IP address "192.168.0.101", the access path number "1", the LUN "LUN2", the server WWN "WWN1", the storage WWN "WWN13", the fabric ID "1", the domain IDs {"1", "2", "4"} and {"1", "3", "4"} of switches on paths, and the number "2" of the paths are registered in the path management table 115. These pieces of information indicate that an access path the access path number of which is "1" is a path through the FC switch apparatus 300, 300a, and 300c or a path through the FC switch apparatus 300, 300b, and 300c. In this case, the two sets of the domain IDs {"1", "2", "4"} and {"1", "3", "4"} exist, so the number of the paths is "2".

Similarly, the server IP address "192.168.0.101", the access path number "1", the LUN "LUN2", the server WWN "WWN2", the storage WWN "WWN14", the fabric ID "2", the domain ID "1" of a switch on a path, and the number "1" of the path are registered in the path management table 115. These pieces of information indicate that an access path the access path number of which is "2" is a path through the FC switch apparatus 300d. In this case, the one set of the domain ID {"1"} exists, so the number of the path is "1".

That is to say, the number of the access paths for access from the server 200 to the LU 430a is 2 (which is the total number of the access paths the access path numbers of which are "1" and "2"). On the other hand, the number of communication paths in the FC network corresponding to these access paths is 3 (=2+1).

Figure 14:
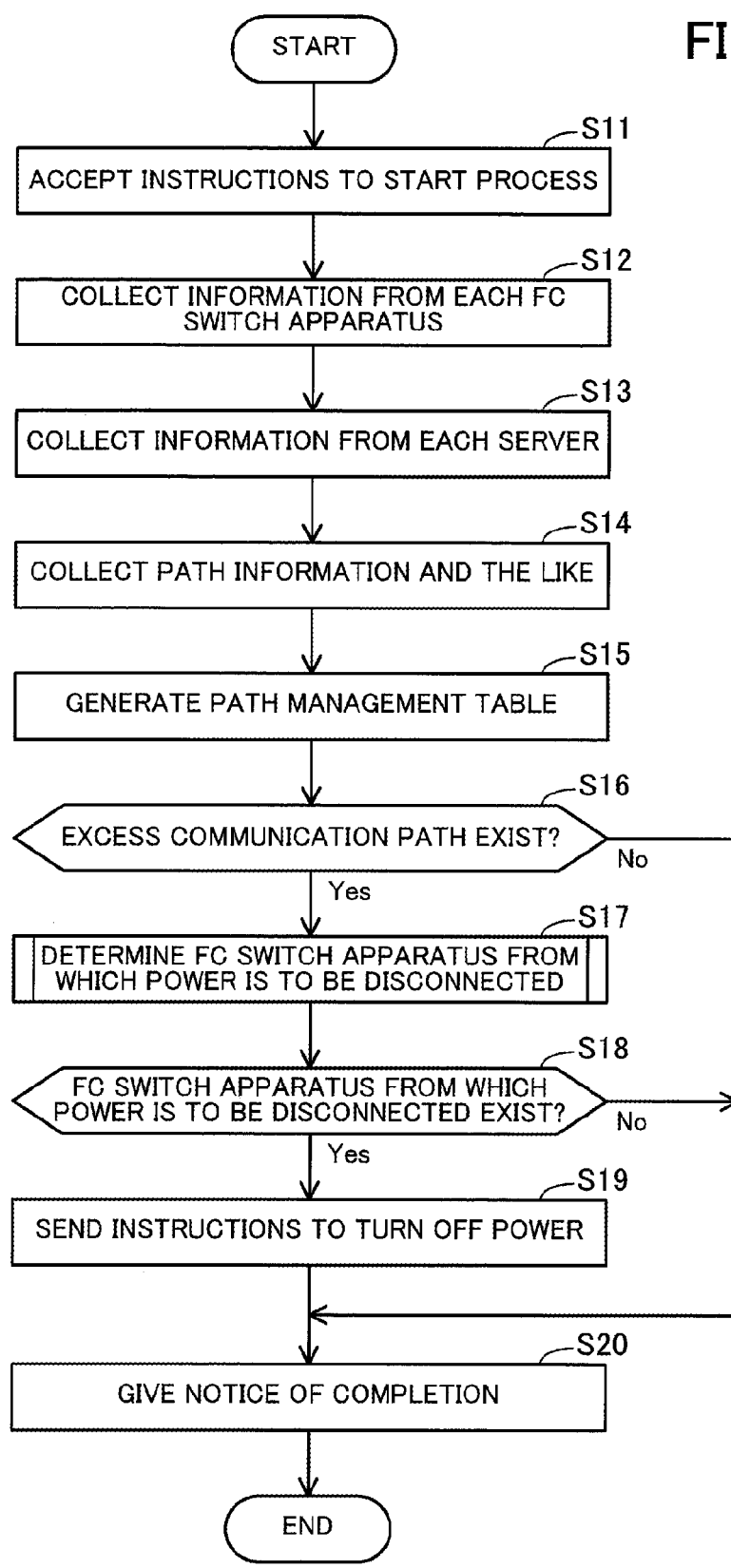
FIG. 14 is a flow chart of an example of control in the second embodiment.

FIG. 14 is a flow chart of an example of control in the second embodiment. A process indicated in FIG. 14 will now be described in order of step number.

(Step S11) The collection unit 120 accepts from the storage system administrator instructions to start a process. For example, the storage system administrator can input the instructions to the management server 100 by operating the input device 12.

(Step S12) The collection unit 120 collects information, such as a fabric ID, a domain ID, and a power state, from each FC switch apparatus. The IP address in the management LAN 10 of each FC switch apparatus from which the collection unit 120 collects information is registered in advance in the switch management table 111 stored in the storage unit 110. The collection unit 120 refers to an IP address registered in the switch management table 111, and can request each FC switch apparatus to provide information. The collection unit 120 registers information which it collects in the switch management table 111. It is assumed that the value of a designation flag is the initial value "0". In addition, the collection unit 120 registers the fabric ID "none", the domain ID "none", and the power state "OFF" for the IP address of an FC switch apparatus from which the collection unit 120 cannot obtain information.

(Step S13) The collection unit 120 collects contents registered in the access management tables 230 and 230a from the servers 200 and 200a and registers them in the LUN management table 112 stored in the storage unit 110. The IP addresses in the management LAN 10 of the servers 200 and 200a from which the collection unit 120 collects contents registered in the access management tables 230 and 230a are registered in advance in the LUN management table 112 stored in the storage unit 110.

(Step S14) The collection unit 120 collects connection information from each FC switch apparatus and registers it in the connection management table 113 stored in the storage unit 110. The collection unit 120 collects path information from each FC switch apparatus and registers it in the path table 114 stored in the storage unit 110.

(Step S15) The path management unit 130 generates the path management table 115 on the basis of the LUN management table 112, the connection management table 113, and the path table 114 and registers the path management table 115 in the storage unit 110. To be concrete, the path management unit 130 refers to the LUN management table 112 and obtains a combination of a server WWN and a storage WWN for each access path number. The path management unit 130 refers to the connection management table 113 and obtains a combination of FC switch apparatus connected to a combination of adapters corresponding to the combination of the server WWN and the storage WWN. The path management unit 130 refers to the path table 114 and obtains a path the ends of which are the combination of the FC switch apparatus (and which is specified by a fabric ID and domain IDs). The domain IDs of FC switch apparatus on a path are arranged in the path table 114 in the order in which data passes through the FC switch apparatus. Accordingly, a set (indicative of a path) in which the combination of the FC switch apparatus obtained from the connection management table 113 are at both ends should be extracted from the Domain IDs of Switches on Path item of the path table 114. The path management unit 130 associates the extracted path with an access path number in the LUN management table 112 and calculates and registers the number of paths. By doing so, the path management unit 130 generates the path management table 115.

(Step S16) The path management unit 130 determines on the basis of the path management table 115 whether or not there is an excess communication path among communication paths between the FC switch apparatus. If there is an excess communication path, then the path management unit 130 proceeds to step S17. If there is no excess communication path, then step S20 is performed. The path management unit 130 uses the following method for determining whether or not there is an excess communication path among communication paths between the FC switch apparatus. That is to say, if the number of access paths by which a server accesses an LU in a storage apparatus is smaller than the number of paths in the FC network corresponding to the access paths, then the path management unit 130 determines that there is an excess communication path. If the number of access paths by which a server accesses an LU in a storage apparatus is greater than or equal to the number of paths in the FC network corresponding to the access paths, then the path management unit 130 determines that there is no excess communication path. In addition, if there is an excess communication path in one of a plurality of correspondences between a server and an LU, then the path management unit 130 determines that there is an excess communication path. In the example of the path management table 115, the correspondence between the server 200 ("192.168.0.101") and the LU 430a ("LUN2") exists as a correspondence between a server and an LU. In this correspondence, the number of the access paths (access path numbers of which are "1" and "2") is 2 and the number of the paths in the FC network is 3 (=2+1). That is to say, the number of the paths is greater than the number of the access paths, so the path management unit 130 determines that there is an excess communication path. In this case, the number of an excess communication path is "1(=3-2)". The same applies to another correspondence between a server and an LU. In the example of the path management table 115, there is an excess communication path in all the correspondences between a server and an LU.

(Step S17) The path management unit 130 determines an FC switch apparatus from which power is to be disconnected. Details will be described later.

(Step S18) The path management unit 130 determines on the basis of a processing result in step S17 whether or not there is an FC switch apparatus from which power is to be disconnected. If there is an FC switch apparatus from which power is to be disconnected, then the path management unit 130 proceeds to step S19. If there is no FC switch apparatus from which power is to be disconnected, then step S20 is performed.

(Step S19) The path management unit 130 gives the designation unit 140 instructions to send the FC switch apparatus from which power is to be disconnected instructions to turn off power. The designation unit 140 sends the designated FC switch apparatus instructions to turn off power.

(Step S20) The designation unit 140 informs the storage system administrator of a processing result. For example, if the designation unit 140 sends instructions in step S19 to turn off power, then the designation unit 140 gives the storage system administrator notice to that effect. On the other hand, if in step S18 there is no FC switch apparatus from which power is to be disconnected, then the designation unit 140 gives the storage system administrator notice to that effect. For example, the designation unit 140 can give the storage system administrator notice by displaying a determined message on the display 11.

The management server 100 blocks in this way an excess communication path which exists among communication paths between the FC switch apparatus. In step S11, the management server 100 starts a process in accordance with instructions from the storage system administrator. However, the management server 100 may start a process with another thing as an opportunity.

For example, the management server 100 may start the above process in a determined cycle. Furthermore, for example, the management server 100 may start the above process in the case of a change in communication path between FC switch apparatus. To be concrete, the management server 100 collects path information in a determined cycle. If there is a difference between path information collected the last time and path information collected this time, then the management server 100 can detect a change in communication path. In addition, for example, the storage system administrator may store connection information and path information in the storage unit 110.

Furthermore, for example, the management server 100 may regularly collect information included in the access management tables 230 and 230a from the servers 200 and 200a respectively. If there is a difference between information collected the last time and information collected this time, then the management server 100 may start the above process. Moreover, the storage system administrator may store information included in the access management tables 230 and 230a in the storage unit 110.

A procedure for the process in step S17 of determining an FC switch apparatus from which power is to be disconnected will now be described.

Figure 15:
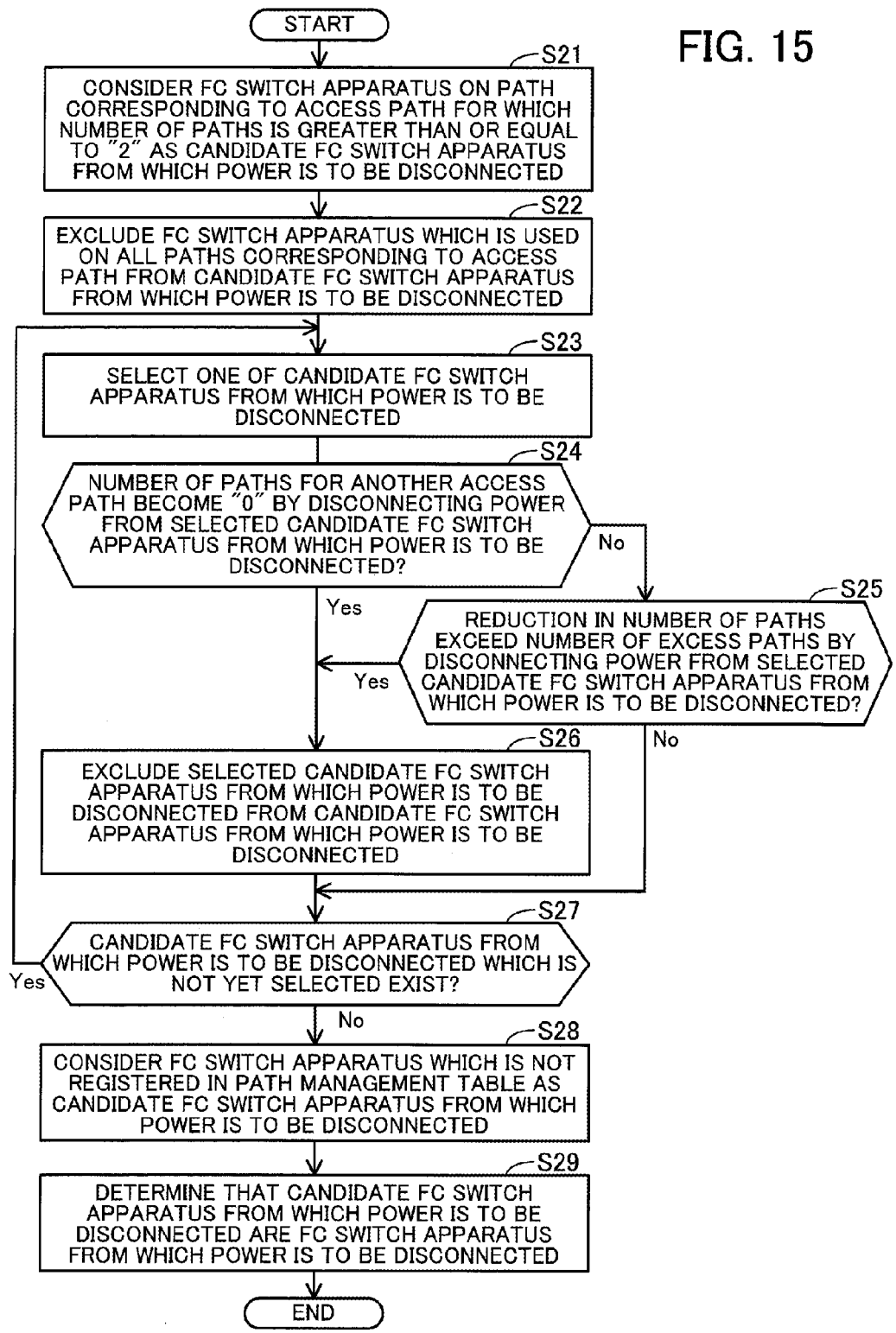
FIG. 15 is a flow chart of an example in the second embodiment of determining an FC switch apparatus from which power is to be disconnected.

FIG. 15 is a flow chart of an example in the second embodiment of determining an FC switch apparatus from which power is to be disconnected. A process indicated in FIG. 15 will now be described in order of step number.

(Step S21) On the basis of the path management table 115, the path management unit 130 considers FC switch apparatus on a path corresponding to an access path for which the number of paths is greater than or equal to "2" as candidate FC switch apparatus from which power is to be disconnected. In the example of the path management table 115, the number of paths is "2" for the access paths the access numbers of which are "1", "3", "5", and "7". Accordingly, the path management unit 130 considers the FC switch apparatus 300, 300a, 300b, and 300c on the paths corresponding to these access paths as candidate FC switch apparatus from which power is to be disconnected. The path management unit 130 registers "1" in the Designation Flag item of the switch management table 111 for the FC switch apparatus which are not candidate FC switch apparatus from which power is to be disconnected of the FC switch apparatus registered in the path management table 115 in order to keep them in a power on state.

(Step S22) The path management unit 130 excludes an FC switch apparatus which is common to all paths corresponding to an access path from the FC switch apparatus which are considered in step S21 as candidate FC switch apparatus from which power is to be disconnected. In the example of the path management table 115, the FC switch apparatus 300 and 300c (domain IDs of which are "1" and "4" respectively) are common to the two paths corresponding to the access path the access path number of which is "1". Therefore, the path management unit 130 excludes the FC switch apparatus 300 and 300c from the candidate FC switch apparatus from which power is to be disconnected. In addition, the FC switch apparatus 300a (domain ID of which is "2") is common to the two paths corresponding to the access path the access path number of which is "5". Therefore, the path management unit 130 excludes the FC switch apparatus 300a from the candidate FC switch apparatus from which power is to be disconnected. The path management unit 130 registers "1" in the Designation Flag item of the switch management table 111 for the FC switch apparatus which is excluded from the candidate FC switch apparatus from which power is to be disconnected.

(Step S23) The path management unit 130 selects one of the FC switch apparatus which are considered as a result of step S22 as candidate FC switch apparatus from which power is to be disconnected. For example, the path management unit 130 may select the FC switch apparatus which are considered as candidate FC switch apparatus from which power is to be disconnected one at a time in ascending order of (fabric ID, domain ID) corresponding to each FC switch apparatus. Ascending order of (fabric ID, domain ID) is, for example, the order of ("1", "1"), ("1", "2"), ..., ("2", "1"), ("2", "2"), and so on. However, selection may be carried out by another method. For example, of the FC switch apparatus which are considered as candidate FC switch apparatus from which power is to be disconnected, an FC switch apparatus a load on which is light may be selected preferentially. Disconnecting power from an FC switch apparatus a load on which is light will have only a limited influence on entire communication.

(Step S24) The path management unit 130 determines whether or not the number of paths for another access path becomes "0" by disconnecting power from the selected candidate FC switch apparatus from which power is to be disconnected. If the number of paths for another access path becomes "0", then the path management unit 130 proceeds to step S26. If the number of paths for another access path does not become "0", then the path management unit 130 proceeds to step S25.

(Step S25) The path management unit 130 determines whether or not a reduction in the number of paths exceeds the number of excess paths by disconnecting power from the selected candidate FC switch apparatus from which power is to be disconnected. If a reduction in the number of paths exceeds the number of excess paths, then the path management unit 130 proceeds to step S26. If a reduction in the number of paths does not exceed the number of excess paths, then the path management unit 130 maintains a state in which the selected candidate FC switch apparatus from which power is to be disconnected remains a candidate FC switch apparatus from which power is to be disconnected, and proceeds to step S27.

(Step S26) The path management unit 130 excludes the selected candidate FC switch apparatus from which power is to be disconnected from the candidate FC switch apparatus from which power is to be disconnected. The path management unit 130 registers "1" in the Designation Flag item of the switch management table 111 for the FC switch apparatus which is excluded from the candidate FC switch apparatus from which power is to be disconnected.

(Step S27) The path management unit 130 determines whether or not among the candidate FC switch apparatus from which power is to be disconnected, there is an FC switch apparatus which is not selected in step S23. If there is an FC switch apparatus which is not selected in step S23, then the path management unit 130 proceeds to step S23. If all the candidate FC switch apparatus from which power is to be disconnected have been selected in step S23, then the path management unit 130 proceeds to step S28.

(Step S28) The path management unit 130 considers an FC switch apparatus which is not registered in the path management table 115 as a candidate FC switch apparatus from which power is to be disconnected. For example, the FC switch apparatus 300e is not registered in the path management table 115. Accordingly, the path management unit 130 considers the FC switch apparatus 300e as a candidate FC switch apparatus from which power is to be disconnected.

(Step S29) The path management unit 130 determines that FC switch apparatus which remain as a result of steps S21 through S28 as candidate FC switch apparatus from which power is to be disconnected are FC switch apparatus from which power is to be disconnected. The path management unit 130 registers "2" in the Designation Flag item of the switch management table 111 for the FC switch apparatus from which power is to be disconnected.

The management server 100 determines in this way FC switch apparatus from which power is to be disconnected. The reason for making a determination in each of the above steps is as follows.

In step S21, FC switch apparatus on a communication path corresponding to an access path for which the number of communication paths is greater than or equal to "2" are considered as candidate FC switch apparatus from which power is to be disconnected. The reason for this is as follows. If there is an access path for which only one communication path exists, blocking the communication path may make it impossible to access a storage apparatus by the access path. To be concrete, there is a case where the number of access paths from a server to a storage apparatus is one and where the number of communication paths corresponding to the access path is one. In this case, an access path from the server to the storage apparatus is lost by blocking the communication path and the server cannot access the storage apparatus. In order to prevent such a situation, candidate FC switch apparatus from which power is to be disconnected are selected in the way described in step S21.

In step S22, an FC switch apparatus which is common to all paths corresponding to an access path is excluded from the candidate FC switch apparatus from which power is to be disconnected. The reason for this is as follows. If power is disconnected from the FC switch apparatus which is common to all the paths, then all the communication paths corresponding to the access path become unusable. If all the communication paths corresponding to the access path become unusable, then the possibility of excessively reducing the number of communication paths increases. In addition, there may be no access path from a server to an LU and the server may be unable to access the LU. In order to prevent such a situation, an FC switch apparatus which is used on all paths corresponding to an access path is excluded from the candidate FC switch apparatus from which power is to be disconnected in the way described in step S22.

In steps S24 and S26, if the number of paths for another access path becomes "0" by disconnecting power from a candidate FC switch apparatus from which power is to be disconnected, then the candidate FC switch apparatus from which power is to be disconnected is excluded from the candidate FC switch apparatus from which power is to be disconnected. "the number of paths for another access path becomes 0" means that a communication path shared by an adapter and a second adapter is blocked and that a communication path from the second adapter to an LU is lost. As a result, the LU cannot be accessed by the use of the second adapter. By adopting the method described in steps S24 and S26, at least one communication path can be ensured for each adapter included in the servers 200 and 200*a*. Accordingly, a situation in which there is no communication path for a usable adapter included in the server 200 or 200*a* can be prevented.

In steps S25 and S26, if a reduction in the number of paths exceeds the number of excess paths by disconnecting power from a candidate FC switch apparatus from which power is to be disconnected, then the candidate FC switch apparatus from which power is to be disconnected is excluded from the candidate FC switch apparatus from which power is to be disconnected. The reason for this is to make it possible to ensure between the FC switch apparatus the number of communication paths ensured on the server side. This makes it possible to efficiently reduce the number of communication paths between the FC switch apparatus, while ensuring the number of communication paths ensured on the server side.

An example of determining an FC switch apparatus from which power is to be disconnected will now be described by taking the state of each table in each of the above steps as an example.

FIGS. 16A and 16B are an example in the second embodiment of determining an FC switch apparatus from which power is to be disconnected (part 1). FIG. 16A indicates by cross-hatching the candidate FC switch apparatus in the path management table 115 from which power is to be disconnected selected in step S21. In FIG. 16A, however, a part of the items included in the path management table 115 are omitted (the same applies to FIG. 17A). It is assumed that all the FC switch apparatus are in an power on state. FIG. 16B indicates the switch management table 111 after the performance of step S21 (crosshatched portions indicate candidate FC switch apparatus from which power is to be disconnected). In FIG. 16B, however, a part of the items included in the switch management table 111 is omitted (the same applies to FIG. 17B and FIGS. 18A and 18B).

In step S21, the path management unit 130 considers FC switch apparatus on a path corresponding to an access path for which the number of paths is greater than or equal to "2" as candidate FC switch apparatus from which power is to be disconnected.

For example, the number of paths is "2" in the fabric having the fabric ID "1" corresponding to the access path number "1". The same applies to the access path numbers "3", "5", and "7". Therefore, the FC switch apparatus 300, 300*a*, 300*b*, and 300*c* on the paths corresponding to the access path numbers "1", "3", "5", and "7" are candidate FC switch apparatus from which power is to be disconnected.

On the other hand, the number of paths is "1" in the fabric having the fabric ID "2" corresponding to the access path number "2". The same applies to the access path numbers "4", "6", and "8". Therefore, the FC switch apparatus (in this case, only the FC switch apparatus 300*d*) on the paths corresponding to the access path numbers "2", "4", "6", and "8" are not candidate FC switch apparatus from which power is to be disconnected. The path management unit 130 registers "1" in the Designation Flag item of the switch management table 111 for the FC switch apparatus 300*d* which is not a candidate FC switch apparatus from which power is to be disconnected of the FC switch apparatus registered in the path management table 115. The path management unit 130 maintains the initial value "0" in the Designation Flag item of the switch management table 111 for the FC switch apparatus 300, 300*a*, 300*b*, and 300*c* which are candidate FC switch apparatus from which power is to be disconnected.

FIGS. 17A and 17B are an example in the second embodiment of determining an FC switch apparatus from which power is to be disconnected (part 2). FIG. 17A indicates by cross-hatching the candidate FC switch apparatus in the path management table 115 from which power is to be disconnected selected in step S22. FIG. 17B indicates the switch management table 111 after the performance of step S22 (crosshatched portions indicate candidate FC switch apparatus from which power is to be disconnected).

In step S22, the path management unit 130 excludes an FC switch apparatus which is common to all paths corresponding to an access path from the FC switch apparatus which are considered in step S21 as candidate FC switch apparatus from which power is to be disconnected.

For example, there are two communication paths in the fabric having the fabric ID "1" corresponding to the access path number "1". The first communication path is a path along which data passes through the FC switch apparatus 300, 300*a*, and 300*c* (domain IDs of which are "1", "2", and "4" respectively) in that order. The second communication path is a path along which data passes through the FC switch apparatus 300, 300*b*, and 300*c* (domain IDs of which are "1", "3", and "4" respectively) in that order. Of the FC switch apparatus on these two communication paths, the FC switch apparatus 300 and 300*c* (domain IDs of which are "1" and "4" respectively) are common to them.

Furthermore, for example, there are two communication paths in the fabric having the fabric ID "1" corresponding to the access path number "5". The first communication path is a path along which data passes through the FC switch apparatus 300 and 300*a* (domain IDs of which are "1" and "2" respectively) in that order. The second communication path is a path along which data passes through the FC switch apparatus 300, 300*b*, 300*c*, and 300*a* (domain IDs of which are "1", "3", "4", and "2" respectively) in that order. Of the FC switch apparatus on these two communication paths, the FC switch apparatus 300*a* (domain ID of which is "2") is common to them.

Similarly, an FC switch apparatus which is common to all paths corresponding to each of the access paths the access path numbers of which are "3" and "7" can be specified. In this case, of the FC switch apparatus 300, 300*a*, 300*b*, and 300*c* which are candidate FC switch apparatus from which power is to be disconnected, each of the FC switch apparatus 300, 300*a*, and 300*c* is common to all the paths. Accordingly, the path management unit 130 excludes the FC switch apparatus 300, 300*a*, and 300*c* from the candidate FC switch apparatus from which power is to be disconnected. As a result, the path management unit 130 registers "1" in the Designation Flag item of the switch management table 111 for the FC switch apparatus 300, 300*a*, and 300*c*. The path management unit 130 maintains the initial value "0" in the Designation Flag item of the switch management table 111 for the FC switch apparatus 300*b* which remains a candidate FC switch apparatus from which power is to be disconnected.

In addition, the path management unit 130 considers the FC switch apparatus 300*e* which is not registered in the path management table 115 as a candidate FC switch apparatus from which power is to be disconnected. That is to say, the path management unit 130 also maintains the initial value "0" in the Designation Flag item of the switch management table 111 for the FC switch apparatus 300e. Furthermore, the path management unit 130 maintains the initial value "0" in the Designation Flag item of the switch management table 111 for a record (for which there is no corresponding FC switch apparatus) including the fabric ID "none" and the domain ID "none".

FIGS. 18A and 18B are an example in the second embodiment of determining an FC switch apparatus from which power is to be disconnected (part 3). FIG. 18A indicates the switch management table 111 after the performance of step S29. In step S29, the path management unit 130 determines that FC switch apparatus which remain as a result of steps S21 through S28 as candidate FC switch apparatus from which power is to be disconnected are FC switch apparatus from which power is to be disconnected. To be concrete, the path management unit 130 registers "2" for a record in the switch management table 111 in which the initial value "0" is registered in the Designation Flag item. By doing so, the path management unit 130 determines that the FC switch apparatus 300b and 300e are FC switch apparatus from which power is to be disconnected. "2" is also registered in the Designation Flag item for the record including the fabric ID "none" and the domain ID "none", but this record may safely be neglected.

FIG. 18B also indicates a state after disconnecting power from the FC switch apparatus 300b and 300e (after step S19 indicated in FIG. 14). For example, on the basis of the switch management table 111, the path management unit 130 informs the designation unit 140 of disconnecting power from the FC switch apparatus 300b and 300e for which the designation flag "2" is set. The designation unit 140 sends the FC switch apparatus 300b and 300e instructions to turn of power. The designation unit 140 receives from each of the FC switch apparatus 300b and 300e a response to the effect that it has accepted the instructions to turn of power. For example, when the designation unit 140 receives this response, the designation unit 140 registers "OFF" in the Power State item of the switch management table 111 for the FC switch apparatus 300b and 300e. The path management unit 130 which receives notice of the response from the designation unit 140 may register the power state "OFF".

Figure 19:
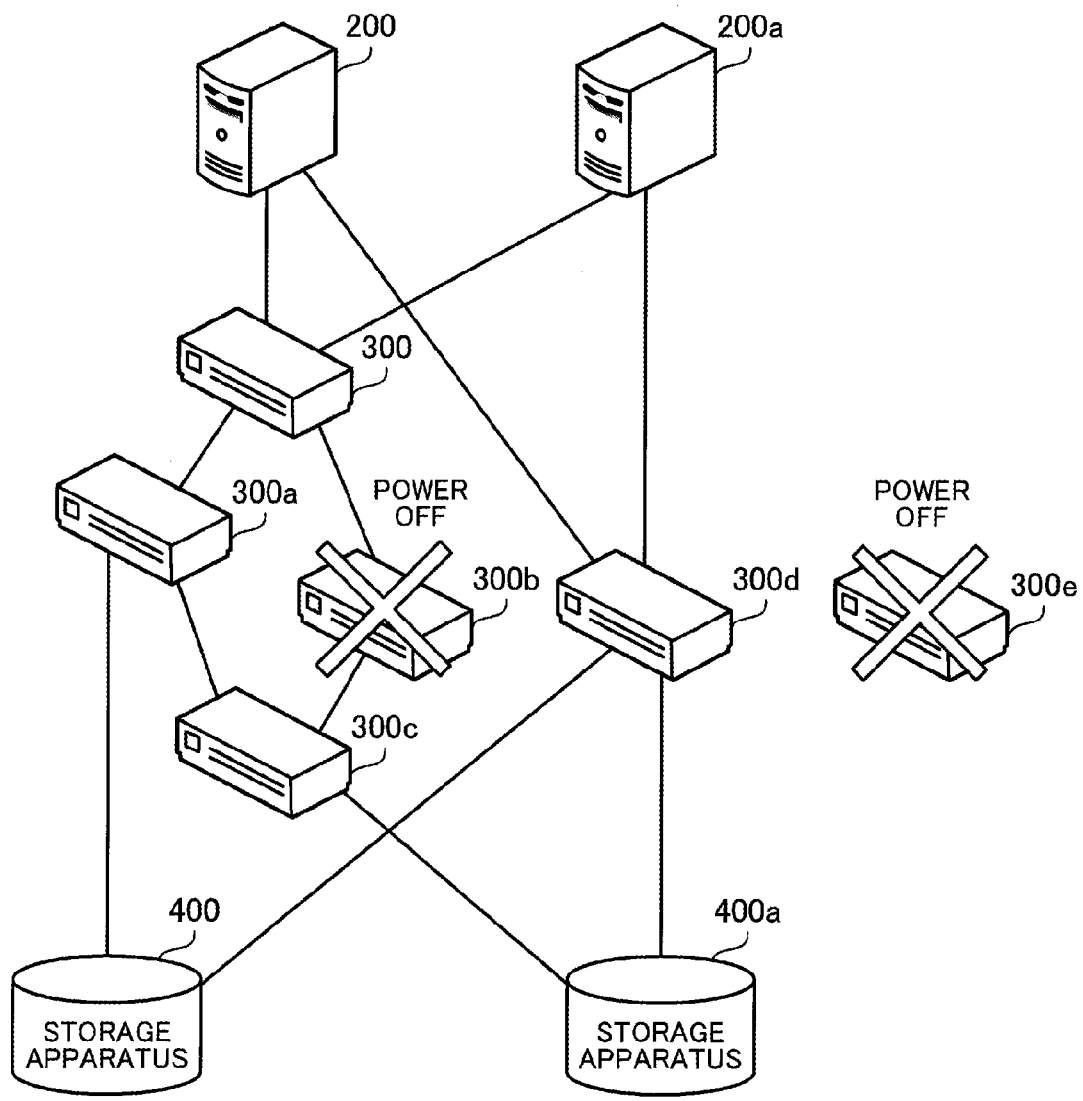
FIG. 19 illustrates FC switch apparatus in the second embodiment from which power is to be disconnected.

FIG. 19 illustrates the FC switch apparatus in the second embodiment from which power is to be disconnected. FIG. 19 illustrates a case where the instructions to turn of power are given to the FC switch apparatus 300b and 300e from which power is to be disconnected on the basis of the switch management table 111 after the performance of step S29 indicated in FIGS. 18A and 18B. The management server 100 (not illustrated in FIG. 19) gives the instructions to turn of power.

The management server 100 detects an excess communication path between FC switch apparatus in this way. The management server 100 disconnects power from the FC switch apparatus 300b on the excess communication path. At this time the management server 100 also takes into consideration the level of the redundancy of communication paths ensured on the server 200 or 200a side and the influence of disconnecting power from an FC switch apparatus on another access path. This makes it possible to efficiently reduce the number of excess communication paths, while maintaining a proper level of redundancy regarding communication paths for access from the server 200 or 200a to the storage apparatus 400 or 400a.

Furthermore, the saving of power can be realized by disconnecting power from the FC switch apparatus 300b on the excess communication path. In addition, heat which may be generated by the FC switch apparatus 300b can be controlled. As a result, power required for cooling an air conditioning system can be reduced and the saving of power can be realized.

Moreover, there is no need for the storage system administrator to extract the FC switch apparatus 300e which does not exist on any communication path. This FC switch apparatus 300e is, for example, a spare FC switch apparatus and it is not necessary that the FC switch apparatus 300e be always in a power on state. Therefore, power is also disconnected from the FC switch apparatus 300e. By doing so, further saving of power can be realized.

Another example of connections in the storage system according to the second embodiment will now be described.

Figure 20:
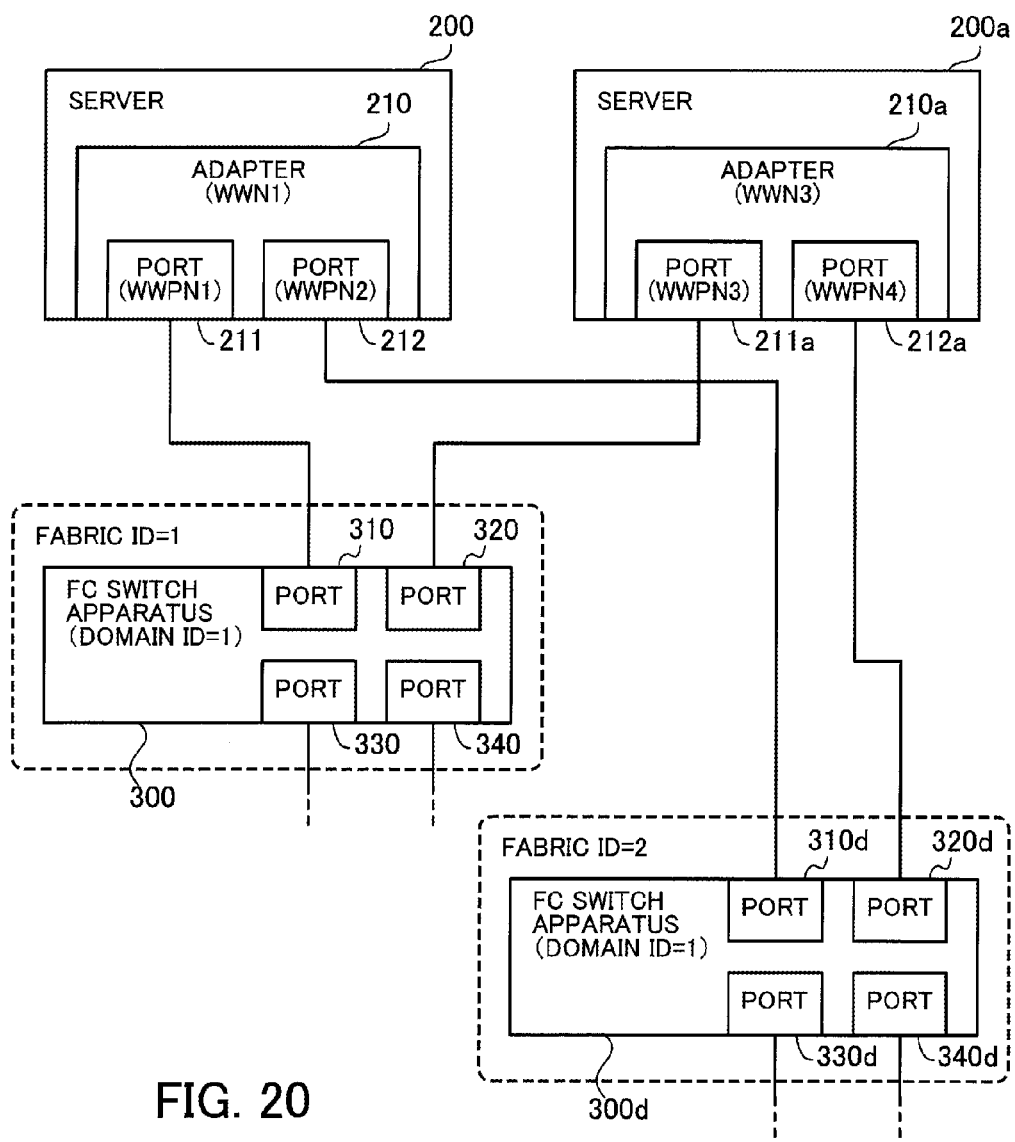
FIG. 20 is another example of connections in the second embodiment.

FIG. 20 is another example of connections in the second embodiment. In the example of connections illustrated in FIG. 5, the server 200 includes the two adapters 210 and 220 and is connected to the FC switch apparatus 300 and 300d via the adapters 210 and 220 respectively. On the other hand, the adapter 210 may include two ports 211 and 212. Furthermore, the adapter 210a may include two ports 211a and 212a. In this case, the server 200 may be connected to the FC switch apparatus 300 and 300d via the ports 211 and 212 respectively. In addition, the server 200a may be connected to the FC switch apparatus 300 and 300d via the ports 211a and 212a respectively. In this case, access paths from the server 200 or 200a to the storage apparatus 400 or 400a are managed according to ports.

For example, identification information referred to as a WWPN (World Wide Port Name) is given to the ports 211, 212, 211a, and 212a. The WWPN of the port 211 is "WWPN1". The WWPN of the port 212 is "WWPN2". The WWPN of the port 211a is "WWPN3". The WWPN of the port 212a is "WWPN4". In this case, correspondences using the WWPNs are defined in advance in the access management table 230 stored in the server 200. This is the same with the access management table 230a stored in the server 200a.

Therefore, a server WWPN item is used in place of the server WWN item in a LUN management table 112, a connection management table 113, and a path management table 115. For example, the management server 100 can acquire the connection relationships between the WWPNs and the FC switch apparatus from a name server in a fabric. The ports 211, 212, 211a, and 212a can be considered as examples of the interface units 2a and 2b in the first embodiment. Furthermore, not only the servers 200 and 200a but also the storage apparatus 400 and 400a may manage access paths according to ports. In this case, a Storage WWPN item is used in place of the Storage WWN item in the LUN management table 112, the connection management table 113, and the path management table 115. Even if this structure is adopted, the number of excess paths between the FC switch apparatus can be reduced efficiently by the above method.

Figure 21:
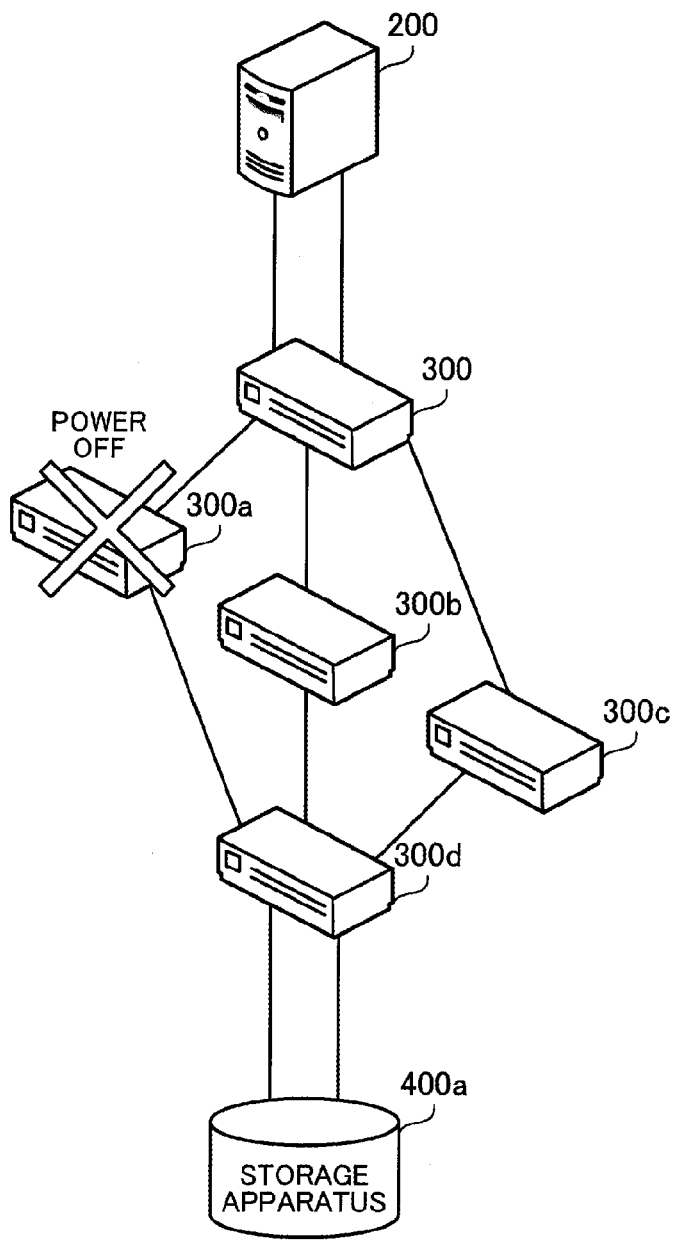
FIG. 21 is still another example of connections in the second embodiment.

FIG. 21 is still another example of connections in the second embodiment. FIG. 21 illustrates an example of connections in an FC network for access from the server 200 to the LU 430a or 440a in the storage apparatus 400a. The server 200, the FC switch apparatus 300, 300a, 300b, 300c, and 300d, and the storage apparatus 400a are connected by FC cables. To be concrete, the server 200 is connected to the FC switch apparatus 300 by two FC cables. The FC switch apparatus 300 is connected to the FC switch apparatus 300a, 300b, and 300c. The FC switch apparatus 300d is connected to the FC switch apparatus 300a, 300b, and 300c. The storage apparatus 400a is connected to the FC switch apparatus 300d by two FC cables. The FC switch apparatus 300, 300a, 300b, 300c, and 300d belong to the same fabric. It is assumed that the domain IDs of the FC switch apparatus 300, 300a, 300b, 300c, and 300d are "1", "2", "3", "4", and "5" respectively.

In the example of FIG. 21, the management server 100 and the management LAN 10 are not illustrated. However, the server 200 and the FC switch apparatus 300, 300a, 300b, 300c, and 300d are also connected to the management LAN 10.

For example, if these connections are made, the management server 100 disconnects power from the FC switch apparatus 300a. For example, the management server 100 selects in ascending order of domain ID a candidate FC switch apparatus from which power is to be disconnected, and determines an FC switch apparatus from which power is to be disconnected (steps S23 through S26 indicated in FIG. 15). As a result, the FC switch apparatus 300a becomes an FC switch apparatus from which power is to be disconnected.

However, the management server 100 may use another method for determining an FC switch apparatus from which power is to be disconnected. In the example of FIG. 21, according to steps S21 and S22 indicated in FIG. 15, the FC switch apparatus 300a, 300b, and 300c are candidate FC switch apparatus from which power is to be disconnected. In this case, one of the FC switch apparatus 300a, 300b, and 300c on which the load is the lightest may be selected preferentially in step S23. Alternatively, one of the FC switch apparatus 300a, 300b, and 300c which links up with the smallest number of ports may be selected preferentially. Even if power is disconnected from these FC switch apparatus, an influence on the FC network will be limited. The management server 100 may use SNMP (Simple Network Management Protocol) for collecting information, such as a load on each FC switch apparatus or the number of ports with which each FC switch apparatus links up (to which each FC switch apparatus transmits data and from which each FC switch apparatus receives data) from each FC switch apparatus.

This makes it possible to efficiently reduce the number of excess communication paths between the FC switch apparatus, while taking the influence of a load on each FC switch apparatus into consideration.

Third Embodiment

A third embodiment will now be described. The differences between the above second embodiment and a third embodiment will mainly be described and description of the same matters will be omitted.

In the second embodiment, the function of blocking a communication path through an FC switch apparatus by disconnecting power from the FC switch apparatus is described. By the way, a plurality of communication paths may be included in an FC switch apparatus. In this case, disconnecting power from the entire FC switch apparatus may also block a communication path which a storage system administrator does not originally want to block. Accordingly, in a third embodiment the function of disconnecting power from a part of ports included in such an FC switch apparatus and blocking only communication paths through these ports is provided. Even if a plurality of communication paths are included in an FC switch apparatus, a part of them can be blocked in this way. Accordingly, even if such an FC switch apparatus is used, the number of excess communication paths can efficiently be reduced.

A storage system according to a third embodiment includes a management server 100, a server 200, FC switch apparatus 300f and 300g, and a storage apparatus 400. An example of hardware of the management server 100 is the same as that of hardware of the management server 100 in the second embodiment described in FIG. 3. An example of software in the management server 100 or the server 200 is the same as that of software in the management server 100 or the server 200 in the second embodiment described in FIG. 8. Adapters included in the server 200 or the storage apparatus 400 are the same as those included in the server 200 or the storage apparatus 400 in the second embodiment described in FIG. 5 or 6. An example of hardware of the FC switch apparatus 300f or 300g is the same as that of hardware of the FC switch apparatus 300 in the second embodiment described in FIG. 4. An example of software in the FC switch apparatus 300f or 300g is the same as that of software in the FC switch apparatus 300 in the second embodiment described in FIG. 8. As described later, however, the FC switch apparatus 300f can include a plurality of port blades each having a plurality of ports. In addition, the FC switch apparatus 300f can supply power according to port blades and a power supply unit can turn on or off power according to port blades.

Figure 22:
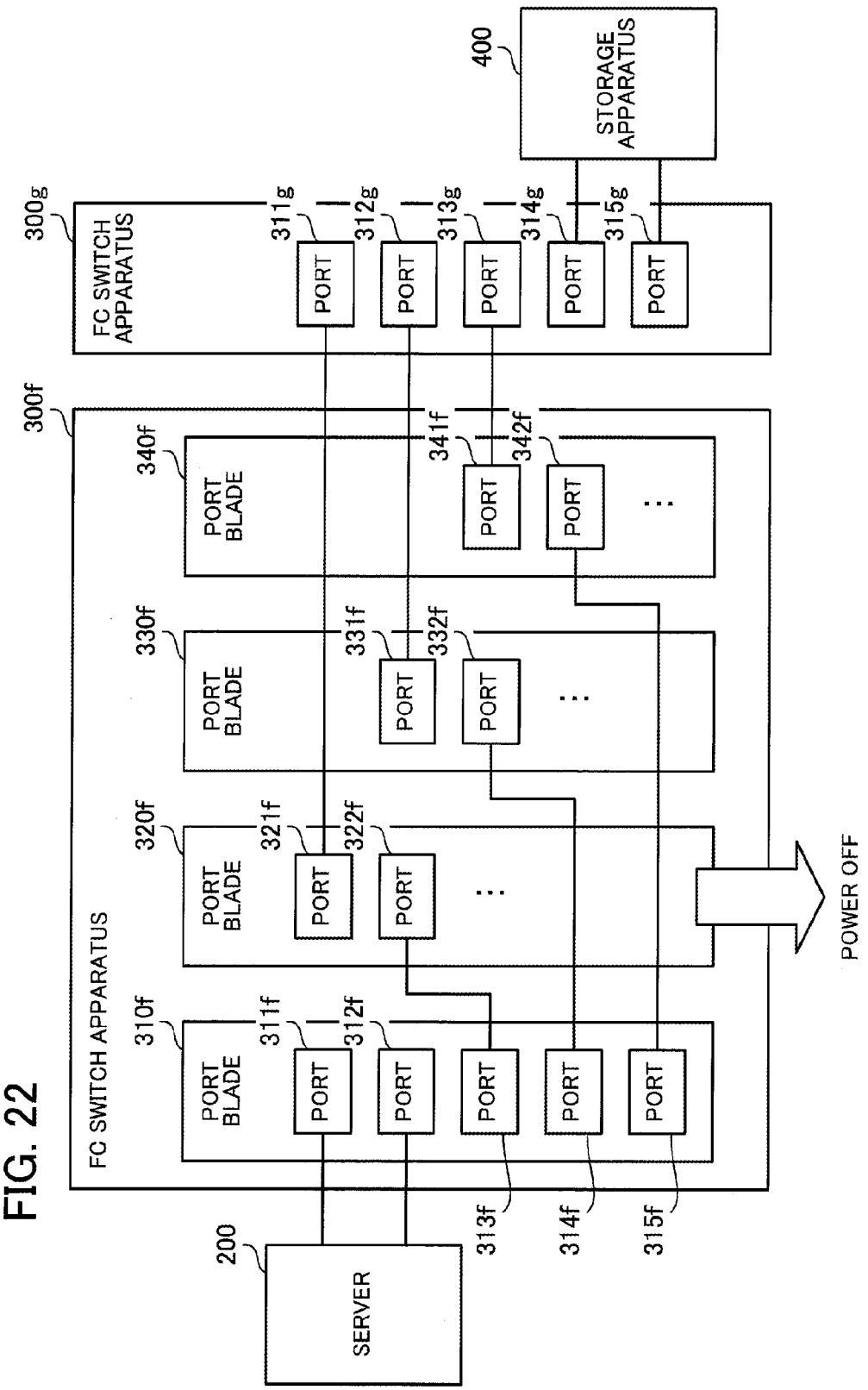
FIG. 22 illustrates a storage system according to a third embodiment.

FIG. 22 illustrates the storage system according to the third embodiment. In the storage system according to the third embodiment it is assumed that the server 200 accesses an LU 430 in the storage apparatus 400. In FIG. 22, the management server 100 and a management LAN 10 are not illustrated. The management server 100, the server 200, and the FC switch apparatus 300f and 300g are connected to the management LAN 10.

The FC switch apparatus 300f includes port blades 310f, 320f, 330f, and 340f. The port blades 310f, 320f, 330f, and 340f are connected to an internal switch. A switch controller included in the FC switch apparatus 300f allocates FC frames to each port of the port blades 310f, 320f, 330f, and 340f.

The port blade 310f includes ports 311f, 312f, 313f, 314f, and 315f. The port blade 320f includes ports 321f and 322f. The port blade 330f includes ports 331f and 332f. The port blade 340f includes ports 341f and 342f.

Furthermore, the FC switch apparatus 300g includes ports 311g, 312g, 313g, 314g, and 315g.

Each of the above ports included in the FC switch apparatus 300f and 300g is an FC port. These ports are connected in the following way by FC cables.

The server 200 is connected to the ports 311f and 312f. To be concrete, an adapter 210 is connected to the port 311f. In addition, an adapter 220 is connected to the port 312f. However, the adapters 210 and 220 are not illustrated.

The ports 313f and 322f are connected. The ports 314f and 332f are connected. The ports 315f and 342f are connected. The ports 321f and 311g are connected. The ports 331f and 312g are connected. The ports 341f and 313g are connected.

The storage apparatus 400 is connected to the ports 314g and 315g. To be concrete, an adapter 410 is connected to the port 314g. In addition, an adapter 420 is connected to the port 315g. However, the adapters 410 and 420 are not illustrated.

In this case, the FC switch apparatus 300f gives fabric IDs and domain IDs (or identification information for them) according to port blades for exercising management. The FC switch apparatus 300f provides fabric IDs and domain IDs according to port blades in response to a request from the management server 100 to provide information.

By using the same method that is described in the second embodiment, the management server 100 can give instructions in this way to turn off power. For example, if there is an excess communication path between the FC switch apparatus 300f and 300g, then the management server 100 can give the FC switch apparatus 300f instructions to turn off power to the port blade 320f. Thus the management server 100 makes the FC switch apparatus 300f stop the supply of power to the port blade 320f. Accordingly, even if the FC switch apparatus 300f including a plurality of communication paths is used, the number of excess communication paths can efficiently be reduced. Furthermore, if the FC switch apparatus 300f includes, for example, a plurality of port blades which belong to different fabrics, then power is turned off according to port blades. By doing so, the number of excess communication paths can efficiently be reduced by the same method that is described in the second embodiment.

Fourth Embodiment

A fourth embodiment will now be described. The differences between the above second or third embodiment and a fourth embodiment will mainly be described and description of the same matters will be omitted.

In the second or third embodiment, an adapter of a server used for accessing an LU is referred to as an access path from the server to the LU. On the other hand, a combination of an adapter included in a server and an adapter included in a storage apparatus which can be used for accessing each LU may be referred to as an access path.

A storage system according to a fourth embodiment includes a management server 100, a server 200, FC switch apparatus 300, 300a, 300b, 300c, 300d, and 300e, and a storage apparatus 400a. In the storage system according to the fourth embodiment it is assumed that the server 200 accesses an LU 430a or 440a in the storage apparatus 400a. An example of hardware of the management server 100 is the same as that of hardware of the management server 100 in the second embodiment described in FIG. 3. An example of hardware of each FC switch apparatus is the same as that of hardware of the FC switch apparatus 300 in the second embodiment described in FIG. 4. An example of software in the management server 100, the server 200, or each FC switch apparatus is the same as that of software in the management server 100, the server 200, or the FC switch apparatus 300 in the second embodiment described in FIG. 8. Adapters included in the server 200 or the storage apparatus 400a are the same as those included in the server 200 or the storage apparatus 400a in the second embodiment described in FIG. 5 or 6.

Figure 23A:
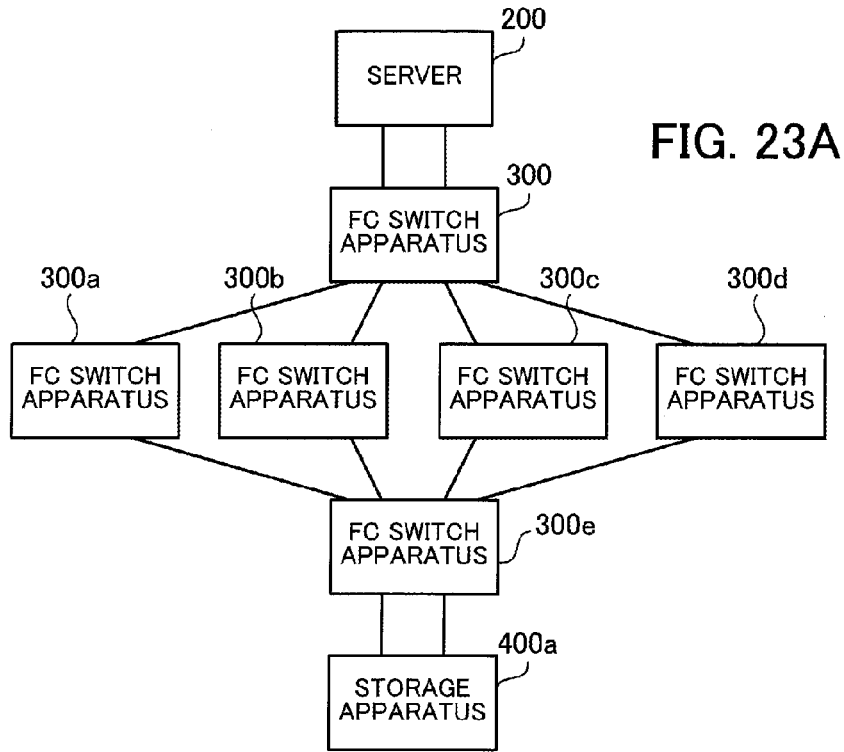
FIGS. 23A and 23B illustrate a storage system according to a fourth embodiment.
Figure 23B:
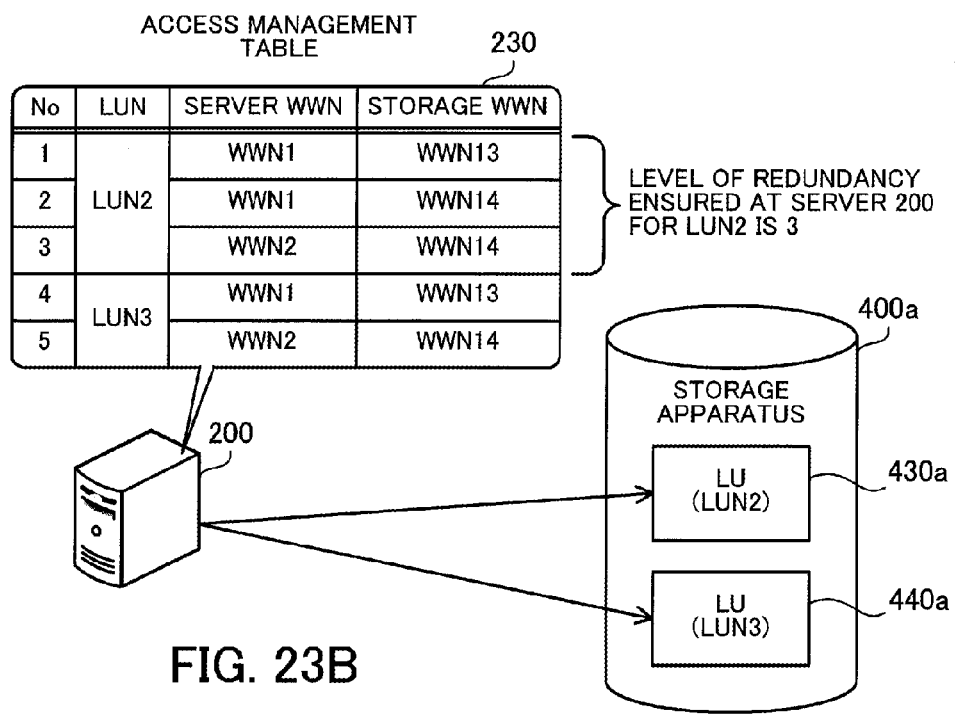

FIGS. 23A and 23B illustrate the storage system according to the fourth embodiment. FIG. 23A illustrates connections made in accordance with FC in the storage system according to the fourth embodiment. The server 200, the FC switch apparatus 300, 300a, 300b, 300c, 300d, and 300e and the storage apparatus 400a are connected by FC cables. The management server 100 and a management LAN 10 are not illustrated. The server 200 and each FC switch apparatus are also connected to the management LAN 10. In addition, the server 200 is connected to the FC switch apparatus 300 by two FC cables. The FC switch apparatus 300 is connected to the FC switch apparatus 300a, 300b, 300c, and 300d. The FC switch apparatus 300e is connected to the FC switch apparatus 300a, 300b, 300c, and 300d. The storage apparatus 400a is connected to the FC switch apparatus 300e. The FC switch apparatus 300, 300a, 300b, 300c, 300d, and 300e belong to the same fabric.

On the other hand, FIG. 23B indicates an access management table 230 which may be stored in the server 200. For example, the three combinations (WWN1, WWN13), (WWN1, WWN14), and (WWN2, WWN14) are registered in the access management table 230 as a combination of a server WWN and a storage WWN for accessing the LU 430a. In this case, paths using these combinations of adapters may be considered as access paths from the server 200 to the storage apparatus 400a. As stated above, the number of access paths corresponds to the level of the redundancy of communication paths ensured on the server side. In this case, three access paths are defined for adapters 210, 220, 410, and 420, so the level of redundancy is "3".

The LUs 430a and 440a are accessed via the same fabric. As indicated in FIG. 23B, the number of the access paths to the LU 430a is "3" and the number of access paths to the LU 440a is "2". That is to say, if a plurality of LUs are accessed via the same fabric, there may be a difference in the number of access paths. In this case, the largest number of access paths in the same fabric may be considered as the level of redundancy ensured at the server 200 for each LU accessed via the same fabric. In the example of FIG. 23B, for example, the level of redundancy ensured at the server 200 for the LU 440a ("LUN3") is set to "3". As a result, even if the number of excess communication paths is reduced by the same method that is described in the second embodiment, control can be exercised so that the number of communication paths between the FC switch apparatus will not be smaller than the level of redundancy ("3") ensured at the server 200 for the LU 430a ("LUN2"). In the example of FIG. 23A, for example, the level of redundancy ("3") ensured at the server 200 for the LU 430a ("LUN2") can be ensured reliably by disconnecting power only from the FC switch apparatus 300a.

The number of combinations of a server WWN and a storage WWN registered in the server 200 may be considered as the level of redundancy ensured at the server 200. In this case, in step S16 described in FIG. 14, the number of the combinations is compared with the number of communication paths between the FC switch apparatus and whether or not there is an excess communication path is determined. By doing so, the number of excess communication paths between the FC switch apparatus can efficiently be reduced. This is the same with the second embodiment.

The functions of the management server 100 can also be realized by making a computer execute a determined program. This program can be recorded on a portable computer-readable record medium. To place this program on the market, record media, for example, on which it is recorded are distributed widely. Alternatively, this program is stored in a server computer and is transferred to a computer via a network. A computer stores, for example, the program recorded on a record medium or the program acquired via a network in its nonvolatile storage medium. The computer then reads the program from the nonvolatile storage medium and executes it. However, the computer can expand the acquired program in order in a RAM and execute it without storing it in the nonvolatile storage medium.

According to an embodiment, the number of excess communication paths can efficiently be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An information processing system comprising:
a plurality of relay apparatus which relay communication between a first node and a second node; and an information processing apparatus which acquires path information indicative of communication paths through the plurality of relay apparatus from at least one of the plurality of relay apparatus, which determines on the basis of information indicative of a plurality of interface units included in the first node and used for access from the first node to the second node and the path information whether or not a number of a plurality of communication paths through the plurality of relay apparatus for access from the plurality of interface units to the second node is greater than a number of the plurality of interface units and which controls, depending on a determination result, at the time of the number of the plurality of communication paths being greater than the number of the plurality of interface units, the plurality of relay apparatus so as to block a part of the plurality of communication paths and at the time of the number of the plurality of communication paths being less than or equal to the number of the plurality of interface units, the plurality of relay apparatus so as to keep the plurality of communication paths open.

2. The information processing system according to claim 1, wherein the information processing apparatus blocks a part of the plurality of communication paths by disconnecting power from a relay apparatus on the plurality of communication paths or by making the relay apparatus stop supply of power to a part of communication ports included in the relay apparatus.

3. The information processing system according to claim 1, wherein when, by blocking a communication path of the plurality of communication paths shared by two or more interface units, a communication path for access from one of the two or more interface units to the second node is lost, the information processing apparatus does not block the communication path shared by the two or more interface units.

4. The information processing system according to claim 1, wherein the information processing apparatus blocks a part of the plurality of communication paths so that a number of communication paths of the plurality of communication paths which are blocked does not exceed a difference between the number of the plurality of communication paths and the number of the plurality of interface units.

5. The information processing system according to claim 1, wherein the information processing apparatus acquires the information indicative of the plurality of interface units from the first node.

6. An information processing apparatus used for controlling a system including a plurality of relay apparatus which relay communication between a first node and a second node, the information processing apparatus comprising:

a memory which stores information indicative of a plurality of interface units included in the first node and used for access from the first node to the second node and path information indicative of communication paths through the plurality of relay apparatus; and a processor which acquires the path information from at least one of the plurality of relay apparatus, which determines, on the basis of the information stored in the memory, whether or not a number of a plurality of communication paths through the plurality of relay apparatus for access from the plurality of interface units to the second node is greater than a number of the plurality of interface units and which controls, depending on a determination result, at the time of the number of the plurality of communication paths being greater than the number of the plurality of interface units, the plurality of relay apparatus so as to block a part of the plurality of communication paths and at the time of the number of the plurality of communication paths being less than or equal to the number of the plurality of interface units, the plurality of relay apparatus so as to keep the plurality of communication paths open.

7. A non-transitory computer-readable storage medium storing a program used for controlling a system including a plurality of relay apparatus which relay communication between a first node and a second node, the program causing a computer to perform a procedure comprising:

acquiring path information indicative of communication paths through the plurality of relay apparatus from at least one of the plurality of relay apparatus;

determining, on the basis of information indicative of a plurality of interface units included in the first node and used for access from the first node to the second node and the path information, whether or not a number of a plurality of communication paths through the plurality of relay apparatus for access from the plurality of interface units to the second node is greater than a number of the plurality of interface units; and controlling, depending on a determination result, at the time of the number of the plurality of communication paths being greater than the number of the plurality of interface units, the plurality of relay apparatus so as to block a part of the plurality of communication paths and at the time of the number of the plurality of communication paths being less than or equal to the number of the plurality of interface units, the plurality of relay apparatus so as to keep the plurality of communication paths open.

* * * * *